(12) United States Patent
Miyake et al.

(10) Patent No.: US 12,038,329 B2
(45) Date of Patent: *Jul. 16, 2024

(54) COLOR MEASUREMENT APPARATUS

(71) Applicant: SEIKO EPSON CORPORATION, Tokyo (JP)

(72) Inventors: Toshio Miyake, Shiojiri (JP); Haruki Miyasaka, Matsumoto (JP); Kenichi Furuya, Shiojiri (JP); Hisayuki Akahane, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/653,383

(22) Filed: Mar. 3, 2022

(65) Prior Publication Data
US 2022/0283033 A1 Sep. 8, 2022

(30) Foreign Application Priority Data

Mar. 4, 2021 (JP) .................................. 2021-034466

(51) Int. Cl.
G01J 3/51 (2006.01)
G01D 5/14 (2006.01)
(Continued)

(52) U.S. Cl.
CPC ................. G01J 3/51 (2013.01); G01D 5/14 (2013.01); G01J 3/0232 (2013.01); G01J 3/50 (2013.01)

(58) Field of Classification Search
None
See application file for complete search history.

(56) References Cited

U.S. PATENT DOCUMENTS 4,916,477 A 4/1990 Date
5,327,193 A 7/1994 Date et al.
(Continued)

FOREIGN PATENT DOCUMENTS

CN 104049293 A 9/2014
CN 209027983 U 6/2019
(Continued)

OTHER PUBLICATIONS

U.S. Appl. No. 17/524,890, filed Nov. 2021, Furuya.
(Continued)

Primary Examiner — Hina F Ayub
(74) Attorney, Agent, or Firm — CHIP LAW GROUP

(57) ABSTRACT

A color measurement apparatus includes an opening portion that is formed in an opening portion forming member arranged in a bottom portion of the apparatus and causes light arriving from a measurement target to enter inside the apparatus, a light emission portion that emits light for measurement toward the measurement target, and a shutter unit that is configured to switch between a closed state in which the opening portion is covered, and an open state in which the opening portion is open, and that has a reflection reference surface at a position facing the opening portion in the closed state as a reference of reflectance, in which the shutter unit is disposed such that the shutter unit is configured to switch to, in addition to the closed state and the open state, an exposed state in which the reflection reference surface is exposed outside the apparatus.

7 Claims, 18 Drawing Sheets

(51) Int. Cl.
*G01J 3/02* (2006.01)
*G01J 3/50* (2006.01)

(56) References Cited

U.S. PATENT DOCUMENTS

| | | | |
|---|---|---|---|
| 6,061,140 | A | 5/2000 | Berg et al. |
| 6,431,446 | B1 | 8/2002 | Gu et al. |
| 6,655,778 | B2 | 12/2003 | Arquilevich et al. |
| 6,764,158 | B2 | 7/2004 | Arquilevich et al. |
| 6,905,187 | B2 | 6/2005 | Arquilevich et al. |
| 6,984,013 | B2 | 1/2006 | Arqullevich et al. |
| 7,257,306 | B2 | 8/2007 | Sakurai et al. |
| 8,179,531 | B2 | 5/2012 | Villagrasa et al. |
| 8,876,302 | B2 | 11/2014 | Yanagisawa |
| 10,479,104 | B2 | 11/2019 | Oguchi |
| 10,900,833 | B2 | 1/2021 | Gomi |
| 2005/0184386 | A1 | 8/2005 | Suzuki |
| 2007/0081156 | A1 | 4/2007 | Treado et al. |
| 2010/0053558 | A1 | 3/2010 | Yanagisawa |
| 2010/0085434 | A1 | 4/2010 | Stewart |
| 2010/0328656 | A1 | 12/2010 | Frick et al. |
| 2010/0328667 | A1 | 12/2010 | Wegmuller et al. |
| 2013/0215182 | A1* | 8/2013 | Yatsunami ............ B41J 19/18 347/16 |
| 2014/0043590 | A1 | 2/2014 | Ozawa |
| 2014/0091211 | A1 | 4/2014 | Kitahara |
| 2014/0152990 | A1 | 6/2014 | Ehbets et al. |
| 2014/0268204 | A1 | 9/2014 | Sasaki et al. |
| 2014/0268342 | A1 | 9/2014 | Matsushita |
| 2015/0085279 | A1 | 3/2015 | Balooch et al. |
| 2015/0239251 | A1 | 8/2015 | Taniguchi et al. |
| 2016/0057330 | A1 | 2/2016 | Zhao et al. |
| 2017/0126933 | A1 | 5/2017 | Kanai |
| 2017/0334220 | A1 | 11/2017 | Tatsuda |
| 2018/0157018 | A1* | 6/2018 | Miller ............... G02B 17/0694 |
| 2019/0023023 | A1* | 1/2019 | Oguchi ............... G01J 3/0205 |
| 2019/0162594 | A1 | 5/2019 | Gomi |
| 2019/0186997 | A1 | 6/2019 | Nakai et al. |
| 2019/0298225 | A1 | 10/2019 | Kaneko et al. |
| 2020/0300705 | A1 | 9/2020 | Saiki |
| 2022/0146307 | A1 | 5/2022 | Miyasaka et al. |
| 2022/0146314 | A1 | 5/2022 | Miyasaka et al. |
| 2022/0146315 | A1 | 5/2022 | Furuya et al. |
| 2022/0146316 | A1 | 5/2022 | Miyasaka et al. |
| 2022/0146317 | A1 | 5/2022 | Miyasaka et al. |
| 2022/0146318 | A1 | 5/2022 | Furuya et al. |
| 2022/0283033 | A1 | 9/2022 | Miyake et al. |

FOREIGN PATENT DOCUMENTS

| | | |
|---|---|---|
| CN | 110018127 A | 7/2019 |
| CN | 209927292 U | 1/2020 |
| JP | H11227176 A | 8/1999 |
| JP | 2002127521 A | 5/2002 |
| JP | 2003179252 A | 6/2003 |
| JP | 2003229996 A | 8/2003 |
| JP | 2003260829 A | 9/2003 |
| JP | 2005236183 A | 9/2005 |
| JP | 2010079253 A | 4/2010 |
| JP | 2010194748 A | 9/2010 |
| JP | 2010221603 A | 10/2010 |
| JP | 2012020423 A | 2/2012 |
| JP | 2013205258 A | 10/2013 |
| WO | 2017195573 A1 | 11/2017 |

OTHER PUBLICATIONS

U.S. Appl. No. 17/524,945, filed Nov. 2021, Furuya.
Office Action for U.S. Appl. No. 17/522,111, dated Jul. 12, 2023.
Office Action for U.S. Appl. No. 17/522,108, dated Oct. 18, 2023.
Office Action for JP Patent Application No. JP2020188423, issued on May 29, 2024, 8 pages of Office Action.

* cited by examiner

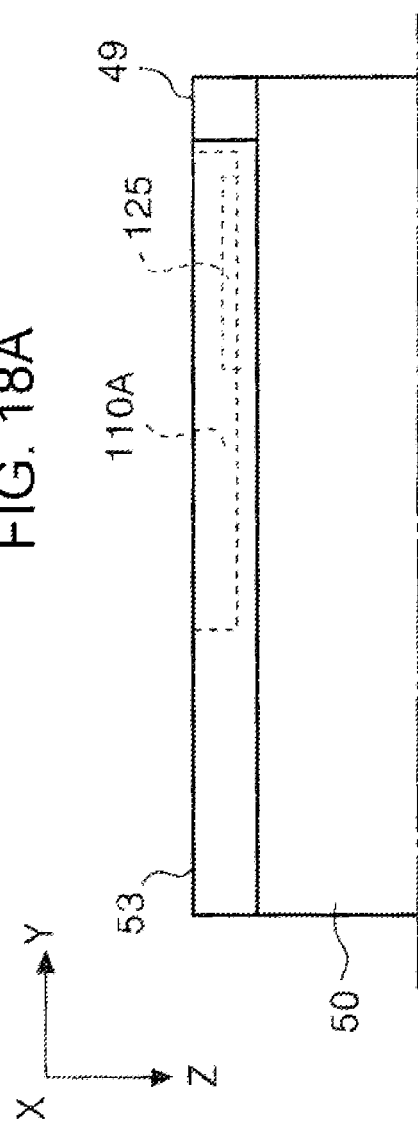
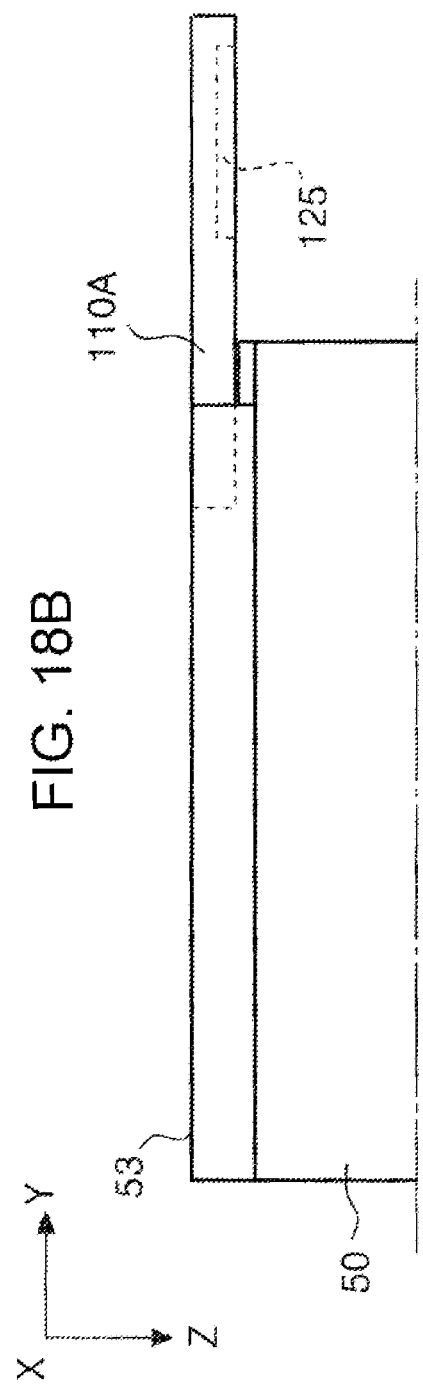

COLOR MEASUREMENT APPARATUS

The present application is based on, and claims priority from JP Application Serial Number 2021-034466, filed Mar. 4, 2021, the disclosure of which is hereby incorporated by reference herein in its entirety.

BACKGROUND

1. Technical Field

The present disclosure relates to a color measurement apparatus that performs color measurement based on light arriving from a measurement target.

2. Related Art

In the related art, color measurement apparatuses that measure color based on light arriving from a measurement target are known. Among the color measurement apparatuses, for example, there is a color measurement apparatus that performs color measurement by causing light arriving from a measurement target to be incident on a spectroscopic filter, extracting a predetermined wavelength component using the spectroscopic filter and receiving the predetermined wavelength component using a photo diode, and detecting a voltage output from the photo diode. In such a color measurement apparatus, an opening portion is disposed on a bottom surface of an apparatus main body. When the opening portion remains in an open state, dust or the like enters inside the apparatus. Thus, a member capable of switching the opening portion between a covered state and an exposed state may be disposed as illustrated in U.S. Patent Application Publication No. 2010/0328656.

A member that covers the opening portion in U.S. Patent Application Publication No. 2010/0328656 is referred to as a support plate. The support plate is disposed to be movable between a position at which a measurement window that is the opening portion is covered, and a position at which the measurement window is exposed. A white reference tile is disposed on the support plate as a reflection reference surface, and a white reference value is configured to be acquired in a state where the support plate covers the measurement window.

When the reflection reference surface is stained, an appropriate reflection reference value cannot be acquired. However, in the color measurement apparatus of the related art, maintainability of the reflection reference surface is not considered.

SUMMARY

According to an aspect of the present disclosure, there is provided a color measurement apparatus including an opening portion that is formed in an opening portion forming member arranged in a bottom portion of the apparatus and causes light arriving from a measurement target to enter inside the apparatus, a light emission portion that emits light for measurement toward the measurement target, an incident light processing portion that processes light incident through the opening portion, and a shutter unit that is configured to switch between a closed state in which the opening portion is covered, and an open state which is a state when color measurement is performed and in which the opening portion is open, and that has a reflection reference surface at a position facing the opening portion in the closed state as a reference of reflectance, in which the shutter unit is disposed such that the shutter unit is configured to switch to, in addition to the closed state and the open state, an exposed state in which the reflection reference surface is exposed outside the apparatus.

BRIEF DESCRIPTION OF THE DRAWINGS

FIGS. 18A and 18B are diagrams illustrating switching of the shutter unit to an exposed state according to another embodiment.

DESCRIPTION OF EXEMPLARY EMBODIMENTS

Figure 1:
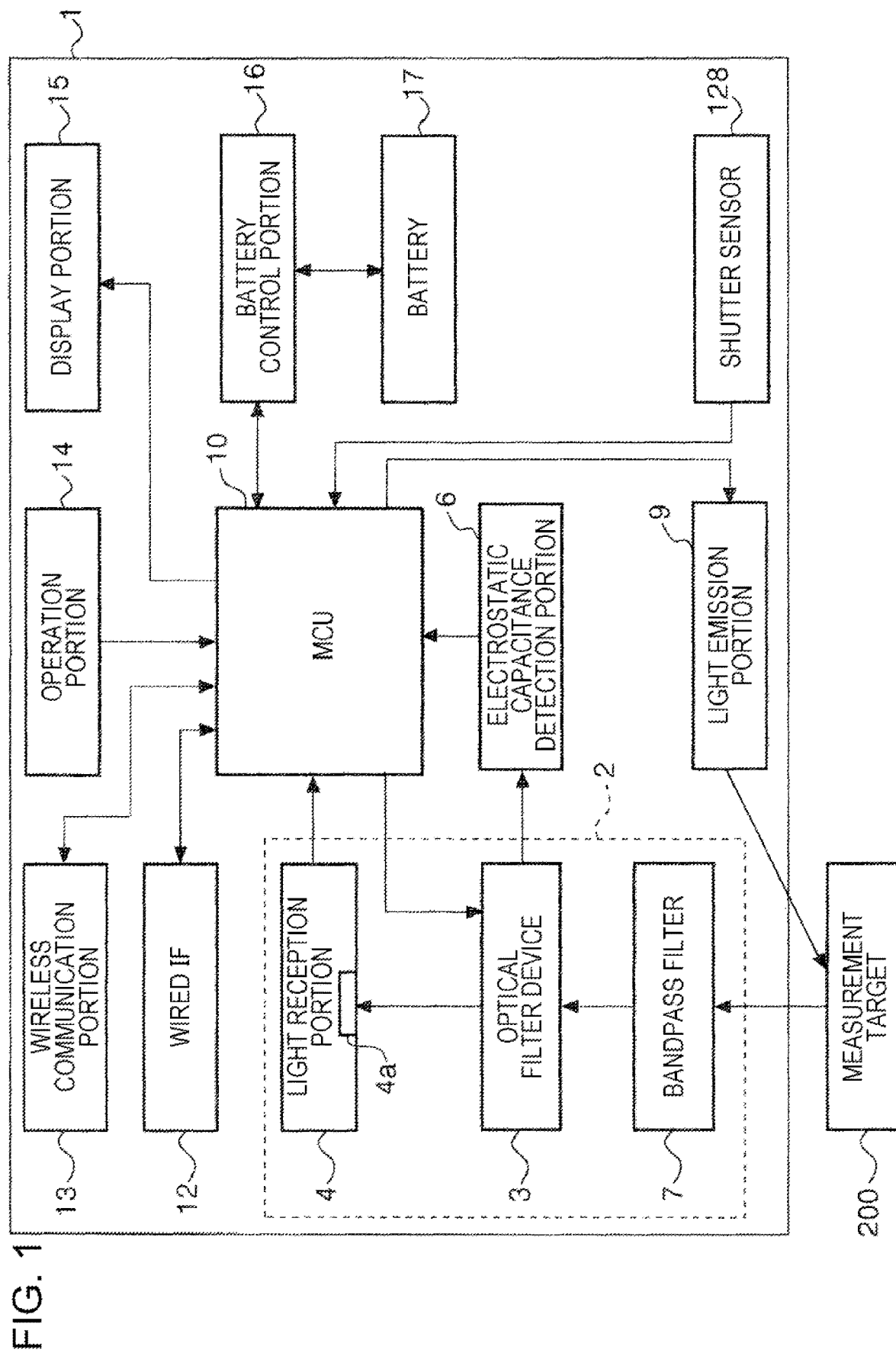
FIG. 1 is a block diagram illustrating functions of a color measurement apparatus.

Hereinafter, the present disclosure will be schematically described.

A color measurement apparatus according to a first aspect includes an opening portion that is formed in an opening portion forming member arranged in a bottom portion of the apparatus and causes light arriving from a measurement target to enter inside the apparatus, a light emission portion that emits light for measurement toward the measurement target, an incident light processing portion that processes light incident through the opening portion, and a shutter unit that is configured to switch between a closed state in which the opening portion is covered, and an open state which is a state when color measurement is performed and in which the opening portion is open, and that has a reflection reference surface at a position facing the opening portion in the closed state as a reference of reflectance, in which the shutter unit is disposed such that the shutter unit is configured to switch to, in addition to the closed state and the open state, an exposed state in which the reflection reference surface is exposed outside the apparatus.

According to the present aspect, the shutter unit is disposed such that the shutter unit is configured to switch to, in addition to the closed state and the open state, the exposed state in which the reflection reference surface is exposed outside the apparatus. Thus, maintenance of the reflection reference surface can be easily performed, and an appropriate reflection reference value can also be acquired.

A second aspect is the color measurement apparatus according to the first aspect, in which the shutter unit includes a sliding member configured to slide along a bottom surface of the apparatus, and a shutter member that is configured to slide along the bottom surface together with the sliding member, has the reflection reference surface, and is configured to rotate with respect to the sliding member, and the shutter unit switches to the exposed state by rotating the shutter member with respect to the sliding member.

According to the present aspect, the shutter unit switches to the exposed state by rotating the shutter member with respect to the sliding member. Thus, the shutter unit can switch to the exposed state with a simple configuration.

A third aspect is the color measurement apparatus according to the second aspect, in which the shutter member abuts on the bottom surface in the exposed state.

According to the present aspect, the shutter member abuts on the bottom surface in the exposed state. Thus, when the reflection reference surface is cleaned, the bottom surface can be supported by the shutter member, and damage to the shutter unit due to application of strong force to the reflection reference surface can be suppressed.

A fourth aspect is the color measurement apparatus according to the second or third aspect, in which the shutter unit switches to the open state by sliding in a first direction from the closed state and switches to the closed state by sliding in a second direction opposite to the first direction from the open state, the shutter member includes a boss that protrudes in a direction intersecting with a sliding direction, a bottom first frame that constitutes the bottom surface, and a bottom second frame that is a member constituting the bottom surface together with the bottom first frame and is positioned in the second direction with respect to the bottom first frame, and the bottom second frame is configured to be attached and detached, regulates rotation of the boss in a mounted state, and allows the rotation of the boss by being detached.

According to the present aspect, the boss, that is, the shutter member, is configured to be rotatable by detaching the bottom second frame. In other words, in the mounted state of the bottom second frame, rotation of the shutter member is regulated. That is, switching of the shutter unit to the exposed state is regulated. Accordingly, unintended switching of the shutter unit to the exposed state is suppressed, and clinging of dust or the like to the reflection reference surface can be suppressed.

A fifth aspect is the color measurement apparatus according to the fourth aspect, further including a first screw that fixes the bottom second frame, and a second screw that fixes the opening portion forming member, in which the second screw is covered with the bottom second frame in the mounted state of the bottom second frame and is exposed by detaching the bottom second frame.

According to the present aspect, the first screw that fixes the bottom second frame, and the second screw that fixes the opening portion forming member are provided. The second screw is covered with the bottom second frame in the mounted state of the bottom second frame and is exposed by detaching the bottom second frame. Thus, when the bottom second frame is detached, accidental detachment of the second screw can be suppressed.

A sixth aspect is the color measurement apparatus according to the fourth or fifth aspect, in which in the mounted state of the bottom second frame, the bottom first frame and the bottom second frame constitute a periphery of the bottom surface, and the bottom first frame and the bottom second frame alternately overlap with each other in coupled parts.

According to the present aspect, the bottom first frame and the bottom second frame alternately overlap with each other in the coupled parts. Thus, entrance of extraneous light inside the apparatus through the coupled parts can be suppressed, and an appropriate color measurement result can be obtained.

A seventh aspect is the color measurement apparatus according to any one of the second to sixth aspects in which the shutter unit includes a shutter holding member that holds the shutter member such that the shutter member is configured to be displaced in a direction of approaching to and separating from the opening portion, and a pressing member that presses the shutter member toward the opening portion.

According to the present aspect, a configuration in which the shutter member is pressed toward the opening portion by the pressing member is provided. Thus, even when a manufacturing error or an assembly error of a part, or wear or the like accompanied by use occurs, occurrence of a gap between the shutter member and the opening portion can be suppressed by pressing the shutter member toward the opening portion. Consequently, entrance of dust or the like into the opening portion can be favorably suppressed.

An eighth aspect is the color measurement apparatus according to any one of the first to seventh aspects, in which the incident light processing portion includes a variable wavelength optical filter that transmits a predetermined wavelength component of incident light, and a light reception portion that receives light transmitted through the optical filter.

According to the present aspect, an effect of any one of the first to seventh aspects is obtained in a configuration in which the incident light processing portion includes the variable wavelength optical filter that transmits the predetermined wavelength component of the incident light, and the light reception portion that receives the light transmitted through the optical filter.

A ninth aspect is the color measurement apparatus according to the eighth aspect, in which the optical filter is a Fabry-Perot etalon.

According to the present aspect, an effect of the eighth aspect is obtained in a configuration in which the optical filter is the Fabry-Perot etalon.

Hereinafter, the present disclosure will be specifically described.

An X-Y-Z coordinate system illustrated in each drawing is an orthogonal coordinate system. An X-Y plane is a horizontal plane, and a Y-Z plane is a vertical plane.

In addition, a Z axis direction is a vertical direction and is an apparatus height direction that intersects with an upper surface $50e$ and a bottom surface $50f$ of a color measurement apparatus 1. In addition, a Y axis direction is a direction orthogonal to the vertical direction and is a longitudinal direction of the apparatus when the color measurement apparatus 1 is viewed from the vertical direction. In addition, the Y axis direction is a sliding direction of a shutter unit 110, described later. In the Y axis direction, a −Y direction is one example of a first direction that is a direction in which the shutter unit 110 in a closed state slides toward an open state. In addition, a +Y direction is one example of a second direction that is a direction in which the shutter unit 110 in the open state slides toward the closed state.

In addition, an X axis direction is a direction orthogonal to the Y axis direction and is a short direction of the apparatus when the color measurement apparatus 1 is viewed from the vertical direction.

In description of a configuration of the color measurement apparatus 1 in the present specification, the bottom surface 50f is mounted on a mounting surface parallel to the horizontal plane, and the longitudinal direction of the color measurement apparatus 1 is in the Y axis direction. Overall Configuration of Color Measurement Apparatus 1

First, an overall configuration of the color measurement apparatus 1 according to the present embodiment will be described with reference to FIG. 1 and FIG. 2.

The color measurement apparatus 1 has a configuration for performing color measurement based on light arriving from a measurement target 200. Examples of light arriving from the measurement target 200 include light reflected by the measurement target 200 and light emitted by the measurement target 200 itself.

The color measurement apparatus 1 includes a bandpass filter 7, an optical filter device 3, a light reception portion 4, an electrostatic capacitance detection portion 6, a light emission portion 9, a micro controller unit (MCU) 10, a wired interface (IF) 12, a wireless communication portion 13, an operation portion 14, a display portion 15, a battery control portion 16, and a battery 17.

The bandpass filter 7, the optical filter device 3, and the light reception portion 4 constitute an incident light processing portion 2 that processes incident light arriving from the measurement target 200.

The bandpass filter 7 transmits light of a visible light range, for example, 380 nm to 720 nm, and cuts light of an ultraviolet light range and an infrared light range out of the incident light arriving from the measurement target 200. Accordingly, light of the visible light range is incident on the optical filter device 3. Light arriving the bandpass filter 7 from the measurement target 200 reaches the bandpass filter 7 through an opening portion 21a and a measurement window portion 87a (refer to FIG. 7 and FIG. 11) described later.

The optical filter device 3 selectively transmits any wavelength component from visible light passing through the bandpass filter 7. Light transmitted through the optical filter device 3 is incident on a photo diode 4a that is one example of a light reception element, and is processed by the light reception portion 4 including the photo diode 4a. The light reception portion 4 converts an intensity of received light into a voltage value, further converts the voltage value into a digital signal, and outputs the digital signal to the MCU 10. The color measurement apparatus 1 can measure a spectrum of the measurement target 200 by repeating wavelength selection performed by the optical filter device 3 and acquisition of a light reception intensity using the light reception portion 4.

Here, a configuration of the optical filter device 3 will be described with reference to FIG. 2. The optical filter device 3 in the present embodiment is a variable wavelength Fabry-Perot etalon that transmits a predetermined wavelength component of the incident light arriving from the measurement target 200, and is a wavelength filter that uses multiple interference between two reflection surfaces facing each other.

Figure 2:
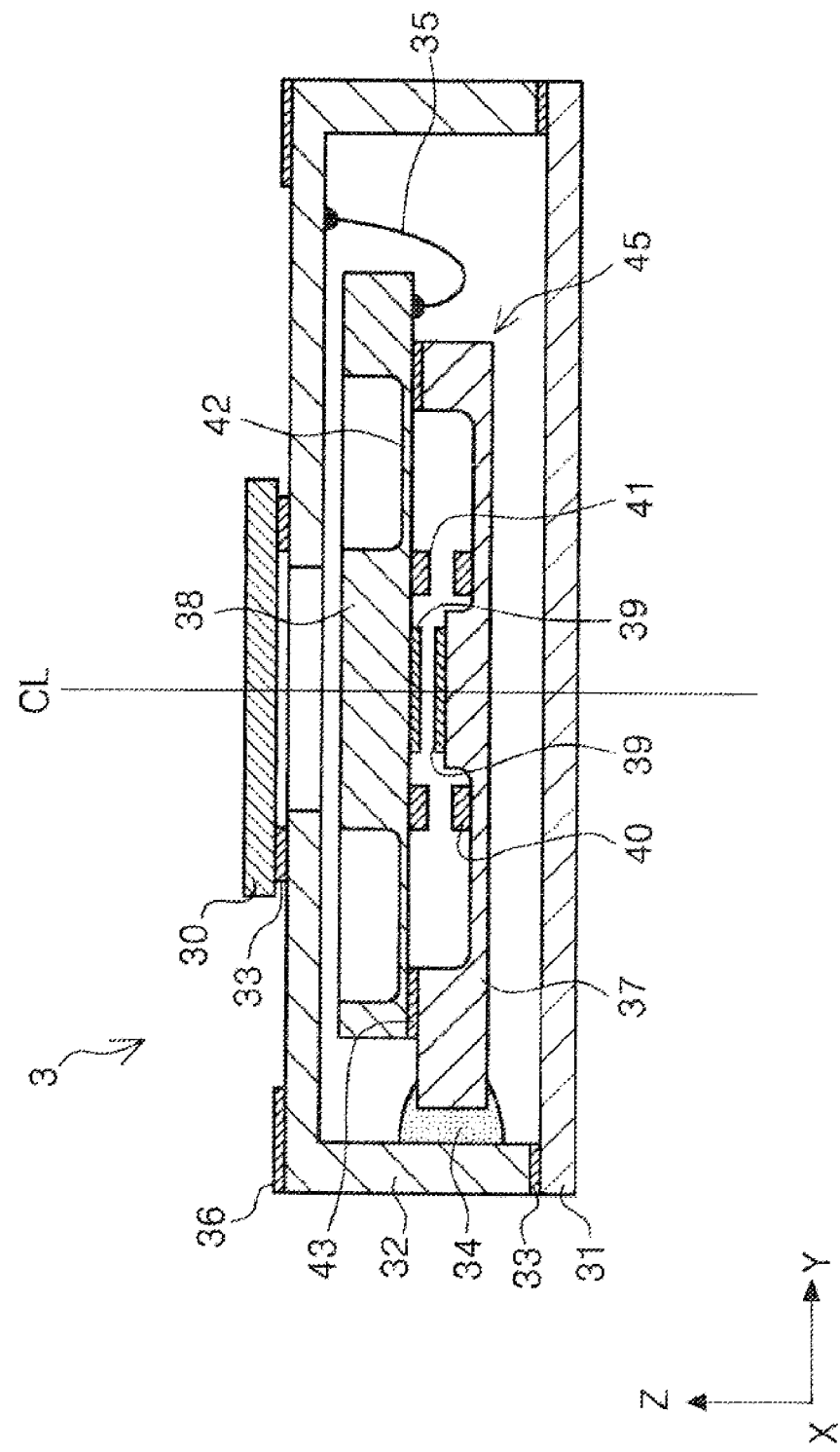
FIG. 2 is a cross-sectional view of an optical filter device.

In FIG. 2, the optical filter device 3 includes a variable wavelength interference filter 45. The variable wavelength interference filter 45 is incorporated inside an exterior body that is configured with a first glass member 30, a second glass member 31, and a case 32.

The case 32 and the first glass member 30, and the case 32 and the second glass member 31 are joined to each other by a joining member 33 such as low melting point glass or epoxy resin. In addition, the variable wavelength interference filter 45 and the case 32 are fixed by a fixing material 34 such as an adhesive. An electrode 36 on an outer surface of the case 32 and the variable wavelength interference filter 45 are conducted by wire bonding 35 and wiring inside the case 32.

The variable wavelength interference filter 45 includes a base substrate 37 and a diaphragm substrate 38. The base substrate 37 and the diaphragm substrate 38 are joined by a joining film 43. A mirror 39 is deposited on each of the base substrate 37 and the diaphragm substrate 38. The outermost surfaces of the mirrors 39 facing each other are formed of a conductor. An electrostatic capacitance between the mirrors 39 facing each other is detected by the electrostatic capacitance detection portion 6 (refer to FIG. 1). The electrostatic capacitance detection portion 6 is configured with a capacitance to voltage (CV) converter and converts the detected electrostatic capacitance into a voltage value, further converts the voltage value into a digital value, and transmits the digital value to the MCU 10.

A distance between the mirrors 39 facing each other is controlled by an electrostatic actuator that is configured by causing a fixed electrode 40 and a movable electrode 41 that are concentrically formed in a view from the Z axis direction to face each other.

When a voltage is applied between the fixed electrode 40 and the movable electrode 41 facing each other, a force that attracts the fixed electrode 40 and the movable electrode 41 to each other is generated by an electrostatic force. At this point, a diaphragm portion 42 that is concentrically formed is deformed. This attracts the mirror 39 of the diaphragm substrate 38 to a base substrate 37 side, and the distance between the mirrors 39 facing each other is controlled. A wavelength of light transmitted through the variable wavelength interference filter 45 is selected in accordance with the distance between the mirrors 39 facing each other.

At a time of spectroscopic measurement, light from the measurement target 200 is incident on the optical filter device 3 from a second glass member 31 side to a first glass member 30 side along an optical axis CL. The optical axis CL is a line that is parallel to the Z axis direction and passes through centers of the opening portion 21a (refer to FIG. 7 and FIG. 11), the measurement window portion 87a (refer to FIG. 7 and FIG. 11), the variable wavelength interference filter 45, and the photo diode 4a (refer to FIG. 1). Particularly, the opening portion 21a, the measurement window portion 87a, and the variable wavelength interference filter 45 have a perfect circular shape in a view from the Z axis direction, and the optical axis CL passes through the centers thereof. Hereinafter, the optical axis CL may be referred to as a center position CL.

Light incident on the optical filter device 3 interferes between the mirrors 39 facing each other, and light of a wavelength selected in accordance with the distance between the mirrors 39 facing each other is transmitted through the variable wavelength interference filter 45. Light transmitted through the variable wavelength interference filter 45 is transmitted through the first glass member 30 and heads toward the light reception portion 4.

The above is the configuration of the optical filter device 3.

Returning to FIG. 1, the MCU 10 that is one example of a control portion performing various controls of the color measurement apparatus 1 is a control apparatus based on a microprocessor and incorporates a memory storing various programs and various data necessary for controlling the color measurement apparatus 1.

The MCU 10 transmits control information necessary for driving the electrostatic actuator, which is configured by causing the fixed electrode 40 and the movable electrode 41 to face each other as described with reference to FIG. 2, to an amplifier, not illustrated, and supplies a predetermined drive voltage to the optical filter device 3 from the amplifier. The MCU 10 compares information related to the voltage value output from the electrostatic capacitance detection portion 6 with a stored value and performs a feedback control of the optical filter device 3 based on the comparison.

The light emission portion 9 emits light for measurement toward the measurement target 200. The light emission portion 9 is configured with a plurality of light emission elements, specifically, a plurality of LEDs, having different wavelength distributions for light emission. The MCU 10 controls turn-on and turn-off of the light emission portion 9.

The wired IF 12 and the wireless communication portion 13 are constituents for communicating with an external apparatus. For example, Universal Serial Bus (USB) can be employed as a standard for communication through the wired IF 12. In addition, for example, Bluetooth can be employed as a standard of the wireless communication portion 13. USB and Bluetooth are registered trademarks. The MCU 10 transmits various data to the external apparatus and receives various data from the external apparatus through the wired IF 12 or the wireless communication portion 13. In addition, the color measurement apparatus 1 can charge the battery 17 by receiving a supply of power from the external apparatus through the wired IF 12.

The operation portion 14 is configured with a power button and various operation setting buttons and transmits a signal corresponding to an operation to the MCU 10. The operation portion 14 will be described in further detail later.

The display portion 15 is configured with, for example, a liquid crystal panel and displays various information such as a user interface for setting a color measurement condition based on a signal transmitted from the MCU 10, and a color measurement result.

A shutter sensor 128 that transmits a detection signal to the MCU 10 is one example of a position detection section for detecting a position of the shutter unit 110, described later. In the present embodiment, the shutter sensor 128 is configured with a magnetic sensor that changes the detection signal depending on a magnetic intensity. The shutter sensor 128 is disposed on a lower surface of a circuit substrate, not illustrated, and transmits, to the MCU 10, a signal corresponding to a change in magnetic force based on a distance to a magnet 127 (refer to FIG. 10) disposed in the shutter unit 110. The MCU 10 can sense whether the shutter unit 110 is in the closed state or the open state based on the signal received from the shutter sensor 128.

The battery 17 is a lithium ion secondary battery in the present embodiment and supplies power to each constituent needing power in the color measurement apparatus 1. The constituents receiving the supply of power from the battery 17 include an incident light processing portion 2 described later. The battery control portion 16 performs various controls such as a charging control of the battery 17. Exterior Configuration of Color Measurement Apparatus 1

Next, an exterior configuration of the color measurement apparatus 1 will be described with reference to FIG. 3 to FIG. 7.

An apparatus main body 50 of the color measurement apparatus 1 is configured to have an outline as a box shape as a whole by a main casing 51, an upper frame 52, a bottom first frame 53, and a bottom second frame 49. The main casing 51, the upper frame 52, the bottom first frame 53, and the bottom second frame 49 are formed of a resin material in the present embodiment.

In each drawing, reference sign 50a denotes a side surface of the apparatus main body 50 in the +Y direction. Hereinafter, the side surface will be referred to as a front surface 50a. In addition, reference sign 50b (refer to FIG. 6) denotes a side surface of the apparatus main body 50 in a +X direction. Hereinafter, the side surface will be referred to as a right surface 50b. In addition, reference sign 50c denotes a side surface of the apparatus main body 50 in a −X direction. Hereinafter, the side surface will be referred to as a left surface 50c. In addition, reference sign 50d denotes a side surface of the apparatus main body 50 in the −Y direction. Hereinafter, the side surface will be referred to as a rear surface 50d.

In the present specification, each term of "up", "down", "left", and "right" is used based on a direction of view from a user when the user of the color measurement apparatus 1 holds the color measurement apparatus 1 with the upper surface 50e facing upward and the rear surface 50d facing the user.

In FIG. 3 to FIG. 6, the front surface 50a is formed by a front wall portion 51a of the main casing 51. The right surface 50b is formed by a right wall portion 51b of the main casing 51. The left surface 50c is formed by a left wall portion 51c of the main casing 51. The rear surface 50d is formed by a rear wall portion 51d of the main casing 51.

In addition, reference sign 50e denotes a surface of the apparatus main body 50 in a +Z direction. Hereinafter, the surface will be referred to as the upper surface 50e. In addition, reference sign 50f denotes a surface of the apparatus main body 50 in a −Z direction. Hereinafter, the surface will be referred to as the bottom surface 50f.

The operation portion 14 and the display portion 15 are arranged on the upper surface 50e of the apparatus main body 50 in the Y axis direction.

The operation portion 14 is configured to include a power button 55, a decision button 54, a return button 56, and a cross button 60. The cross button 60 is configured with an up button 61, a down button 62, a left button 63, and a right button 64. In the color measurement apparatus 1 according to the present embodiment, all operation buttons are arranged on the upper surface 50e and are integrated in the operation portion 14.

The power button 55 is a button for powering the color measurement apparatus 1 ON and OFF. In addition, the decision button 54 is a button for deciding various settings displayed on the display portion 15, that is, a button for deciding a color measurement condition, and is also a button for executing color measurement and acquisition of a reflection reference value described later. The decision button 54 has a perfect circular shape in a view from the Z axis direction.

A light emission portion 59 having a ring shape constitutes a periphery of the decision button 54. A light emission color and a light emission state change in accordance with a state of the apparatus.

The return button 56 is a button for returning to an immediately previous state in the user interface displayed on the display portion 15 and is also a button for canceling execution of an operation.

The cross button 60 is a button for selecting various items in the user interface displayed on the display portion 15.

Various information such as the color measurement result is displayed on the display portion 15. The display portion 15 is configured with a liquid crystal display 67 in the present embodiment. Hereinafter, the liquid crystal display 67 will be abbreviated to the LCD 67. A display portion cover 57 that is a transparent member is disposed in an upper portion of the LCD 67, and a part of the upper surface 50*e* is formed by the display portion cover 57.

In the present embodiment, it is configured that a step almost does not occur between an upper surface of the display portion cover 57 and an upper surface of the operation portion 14. Accordingly, the upper surface 50*e* is configured as a planar surface that almost does not have a step as a whole. However, an upper surface of the decision button 54 is slightly recessed and is formed into a shape that fits a pulp of a finger of the user pushing the decision button 54.

Figure 5:
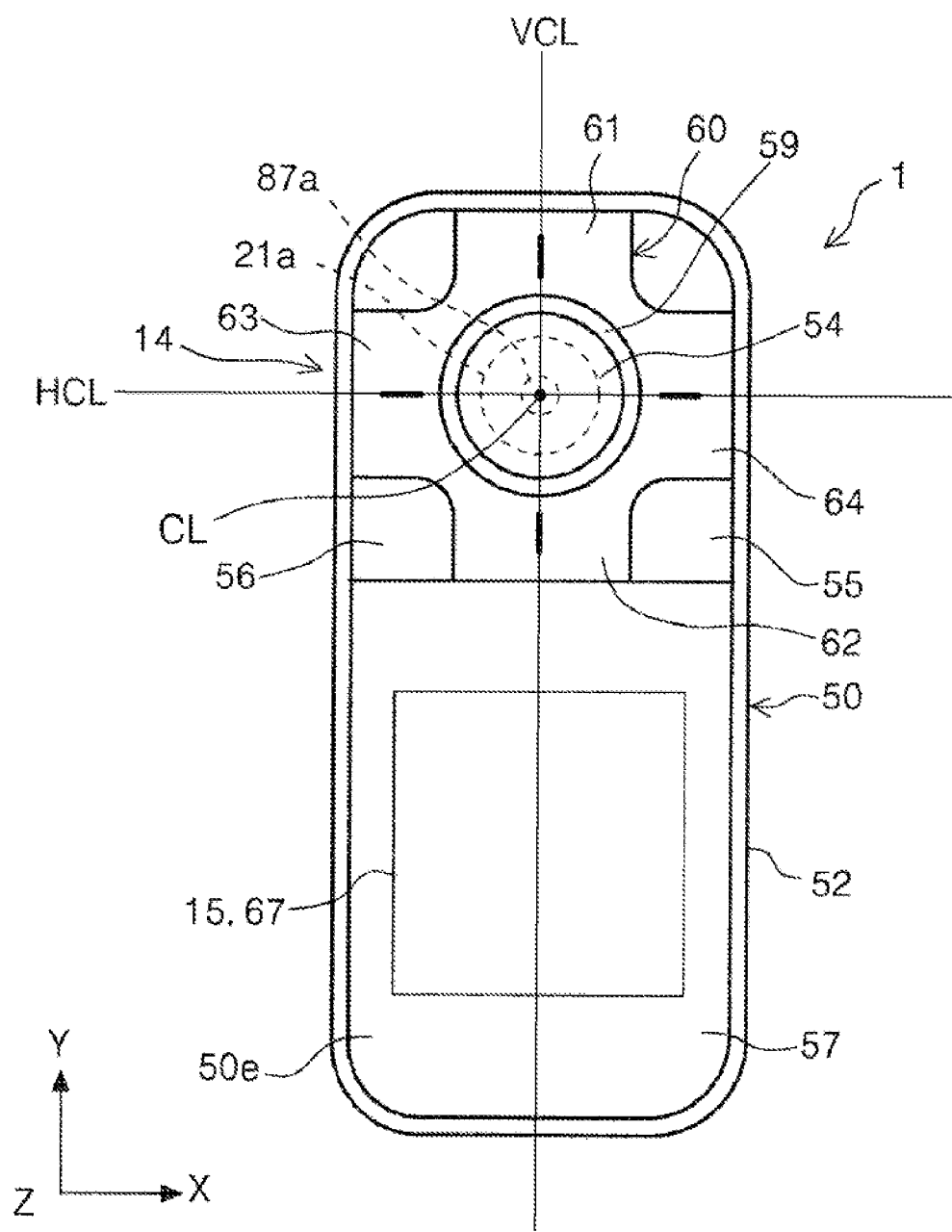
FIG. 5 is a plan view of the upper surface of the color measurement apparatus.

The color measurement apparatus 1 has an overlapping part with the opening portion 21*a* and the operation portion 14 in a view from the Z axis direction as illustrated in FIG. 5. Accordingly, when the user positions the opening portion 21*a* to a measured part of the measurement target 200 (refer to FIG. 1), the positioning can be performed based on a position of the operation portion 14. That is, the opening portion 21*a* can be positioned to the measured part using a simple configuration.

Particularly, the color measurement apparatus 1 is configured as a handy type, and a position of a fingertip and a position of the opening portion 21*a* come closer when the user operates the operation portion 14 with the fingertip. Thus, the position of the opening portion 21*a* is intuitively easily perceived.

In addition, particularly, in the present embodiment, a center position of the opening portion 21*a* coincides with the center position of the decision button 54 in a view from the Z axis direction.

Accordingly, the opening portion 21*a* can be more accurately positioned to the measured part.

In addition, the operation portion 14 is configured by including the power button 55 and all buttons related to measurement on the upper surface 50*e*. Accordingly, the power button 55 and all buttons related to measurement can be easily recognized, and the apparatus can be easily operated.

In addition, the upper surface 50*e* including the operation portion 14 is formed into a planar shape. Accordingly, even in a case of mounting with the upper surface 50*e* facing downward, mounting can be stably performed.

Figure 4:
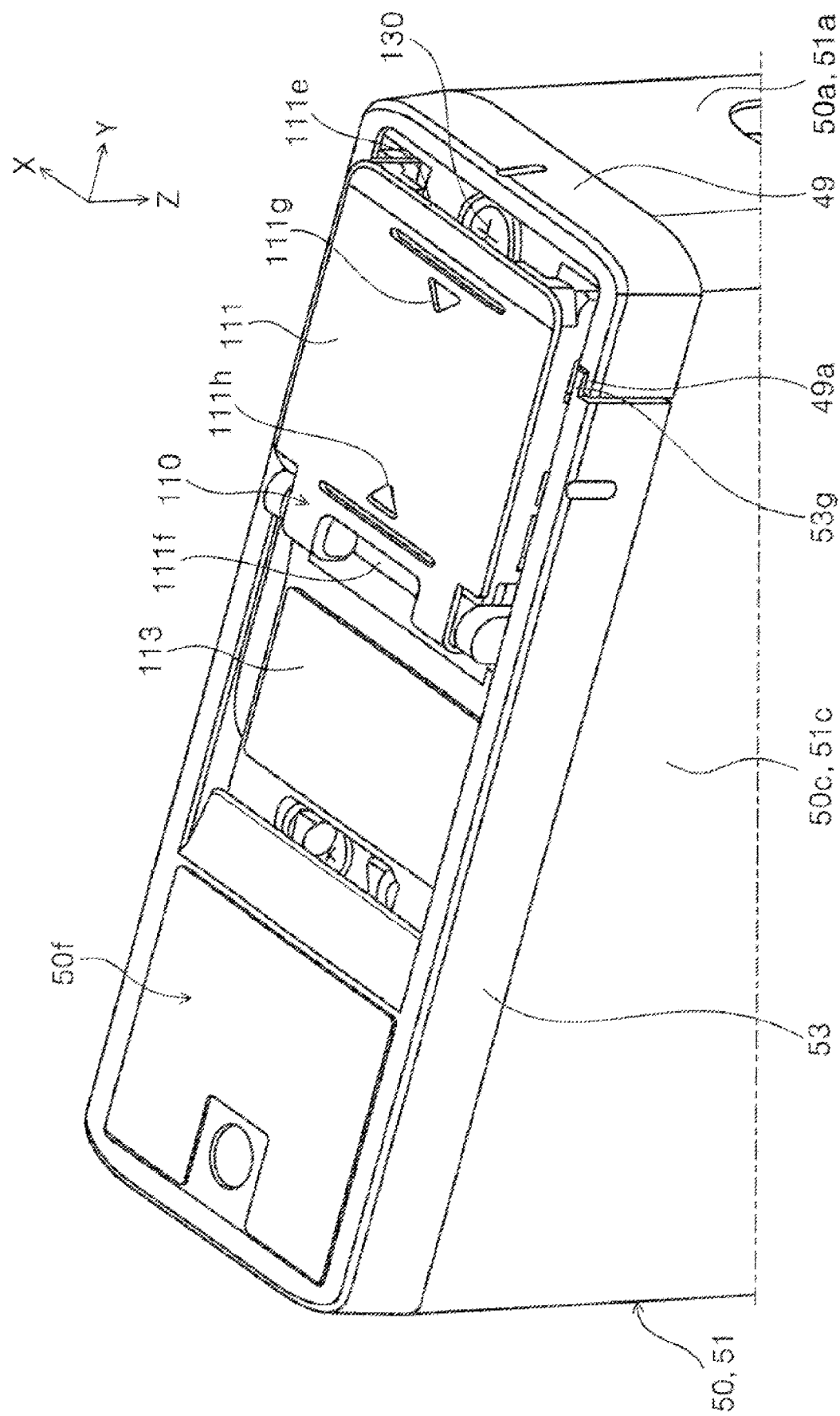
FIG. 4 is a perspective view illustrating a bottom surface of the color measurement apparatus in which a shutter unit is in a closed state.
Figure 6:
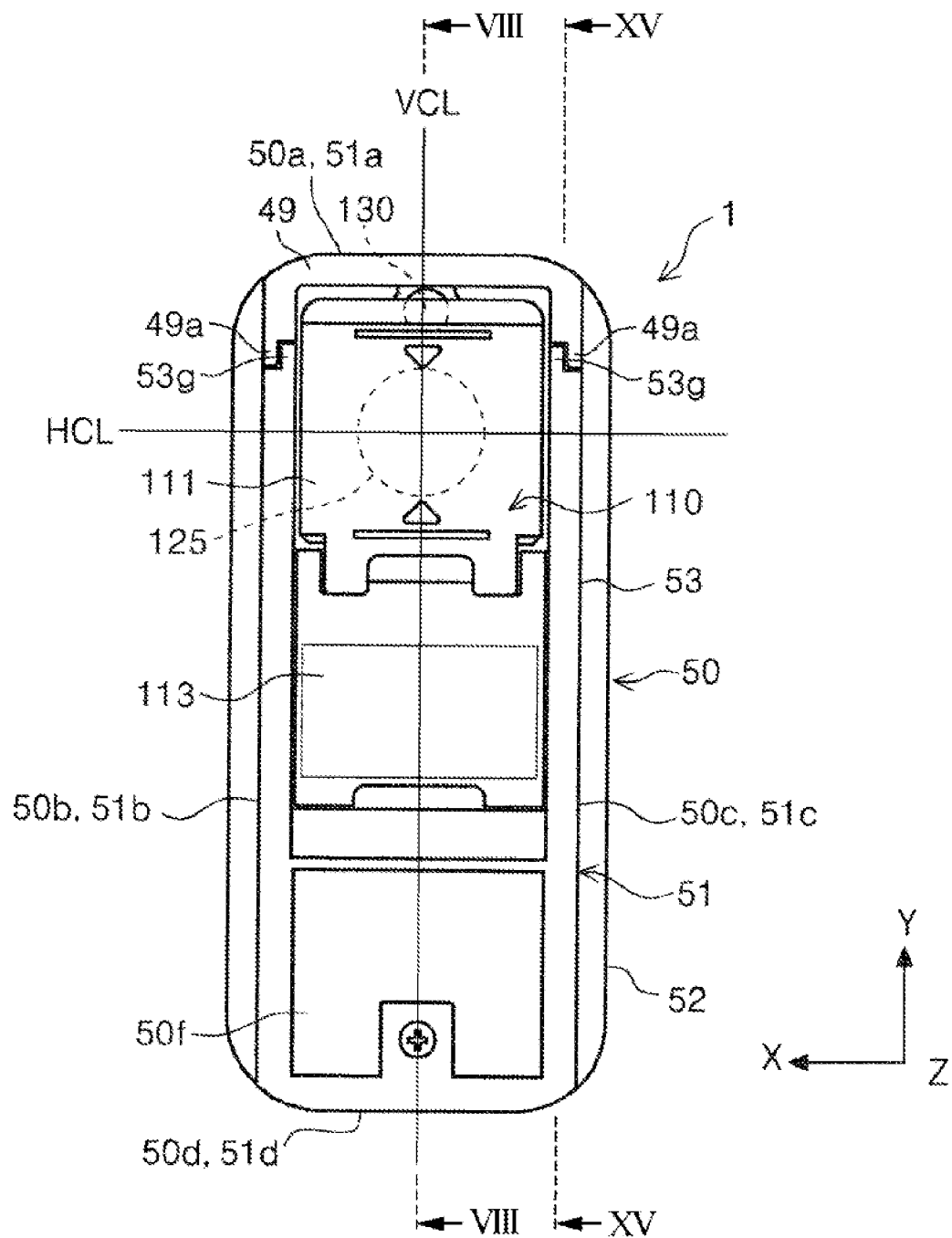
FIG. 6 is a plan view of the bottom surface of the color measurement apparatus in which the shutter unit is in the closed state.
Figure 7:
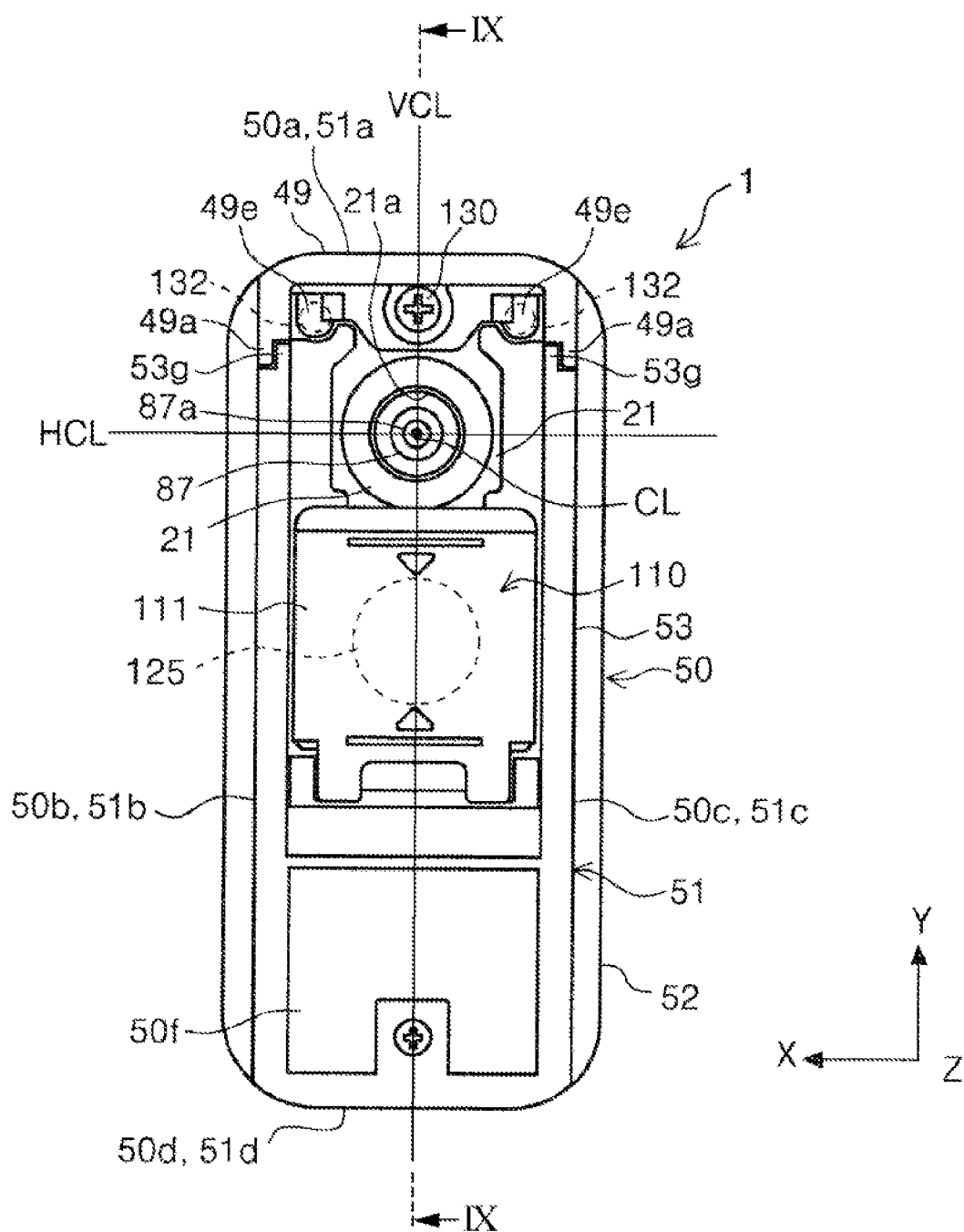
FIG. 7 is a plan view of the bottom surface of the color measurement apparatus in which the shutter unit is in an open state.
Figure 11:
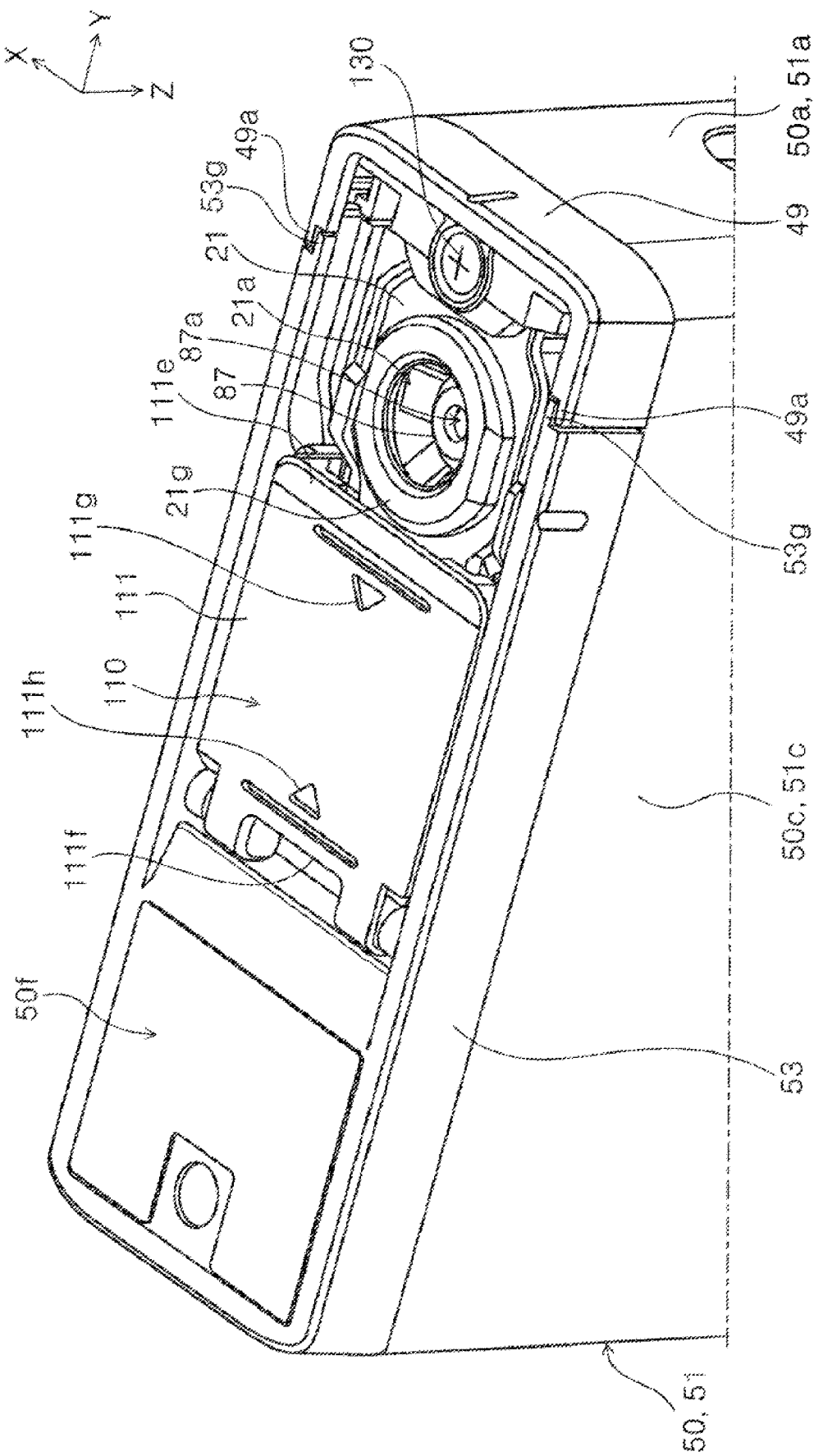
FIG. 11 is a perspective view of the bottom surface of the color measurement apparatus in which the shutter unit is in the open state.

Next, the shutter unit 110 is disposed on the bottom surface 50*f* as illustrated in FIG. 4, FIG. 6, and FIG. 7. FIG. 4 and FIG. 6 illustrate the closed state of the shutter unit 110. FIG. 7 and FIG. 11 illustrate the open state of the shutter unit 110. The shutter unit 110 can be switched between the closed state and the open state by sliding in the Y axis direction, that is, along the bottom surface 50*f*. More specifically, the closed state illustrated in FIG. 4 and FIG. 6 switches to the open state by sliding in the −Y direction. In addition, the open state illustrated in FIG. 7 and FIG. 11 switches to the closed state by sliding in the +Y direction.

As will be described in detail later, the shutter unit 110 is disposed to be holdable in the closed state and the open state.

Opening the shutter unit 110 exposes the opening portion 21*a* and the measurement window portion 87*a* as illustrated in FIG. 7 and FIG. 11. The opening portion 21*a* and the measurement window portion 87*a* are open on the bottom surface 50*f* of the apparatus. Here, being open means that light enters, and for example, means that a transparent glass plate may be disposed.

The opening portion 21*a* is formed in an opening portion forming member 21 arranged in a bottom portion of the apparatus, and the measurement window portion 87*a* is formed in a light condensing member 87 that is positioned in the +Z direction with respect to the opening portion forming member 21. Measurement light emitted from the light emission portion 9 is radiated toward the measurement target 200 from the opening portion 21*a*. Light arriving from the measurement target 200 enters inside the apparatus from the opening portion 21*a*, further passes through the measurement window portion 87*a*, and is incident on the incident light processing portion 2.

As illustrated in FIG. 5 and FIG. 7, the center position CL coincides with center positions of the opening portion 21*a* and the measurement window portion 87*a*. In addition, a straight line VCL is a straight line parallel to the Y axis direction and is a straight line passing through the center position CL in a view from the Z axis direction. In addition, a straight line HCL is a straight line parallel to the X axis direction and is a straight line passing through the center position CL in a view from the Z axis direction.

In the present embodiment, the center position CL coincides with a center position of the decision button 54 in the X-Y plane and also coincides with a center position of the cross button 60.

The power button 55 and the return button 56 are symmetrically arranged about the straight line VCL as illustrated in FIG. 5.

Figure 3:
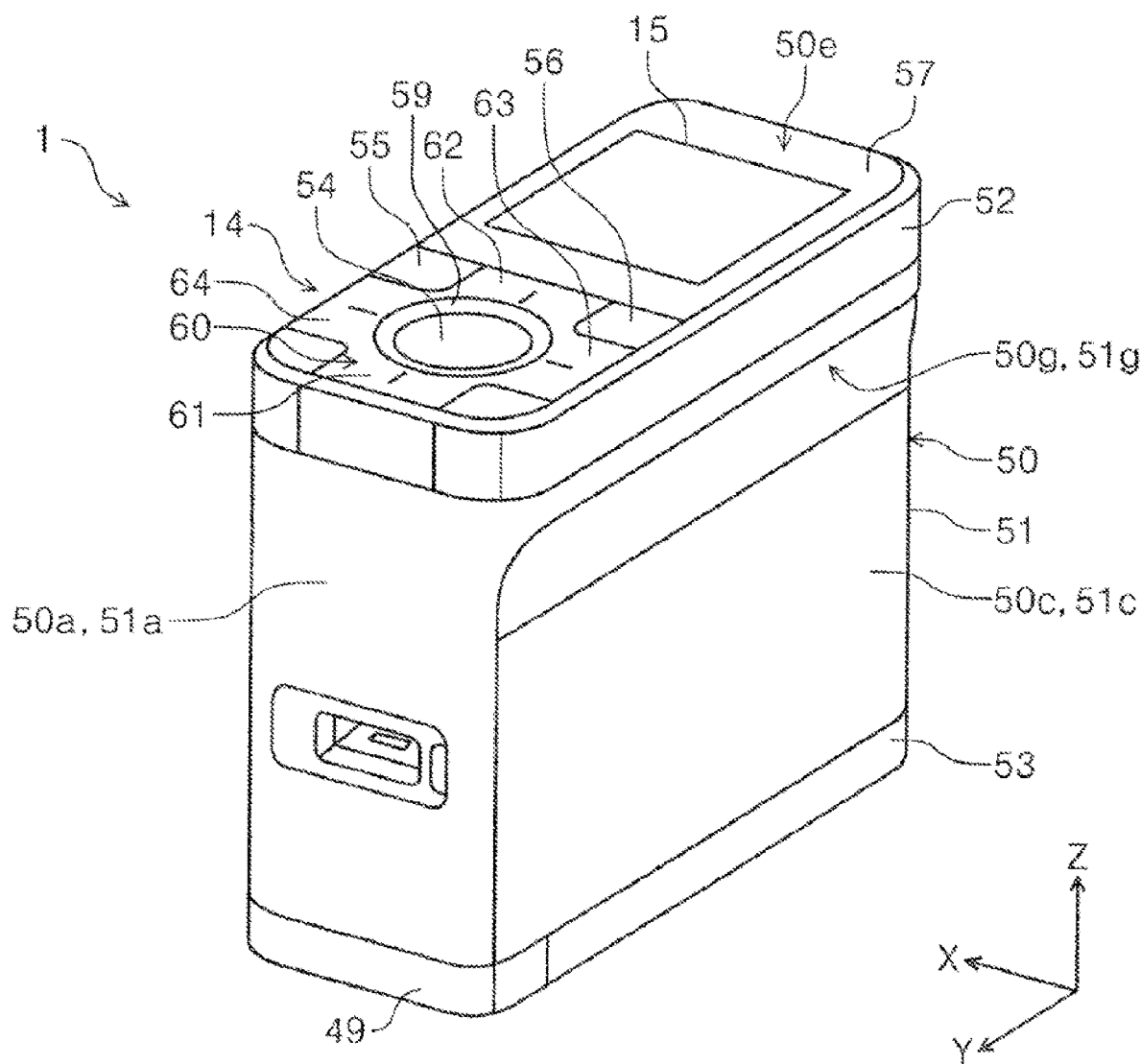
FIG. 3 is a perspective view illustrating an upper surface of the color measurement apparatus.

As illustrated in FIG. 3, a grip portion 50*g* is formed on the left surface 50*c* of the apparatus main body 50. The grip portion 50*g* is configured with a recessed portion 51*g* formed in the left wall portion 51*c* of the main casing 51. The recessed portion 51*g* is formed by a curved surface that faces toward a center, in the X axis direction, of the apparatus main body 50 in the −Z direction. While illustration is not provided, the same grip portion 50*g* is also formed on the right surface 50*b* of the apparatus main body 50. By disposing the grip portion 50*g*, the user can easily and securely grip the apparatus main body 50.

Configuration of Shutter Unit

Figure 10:
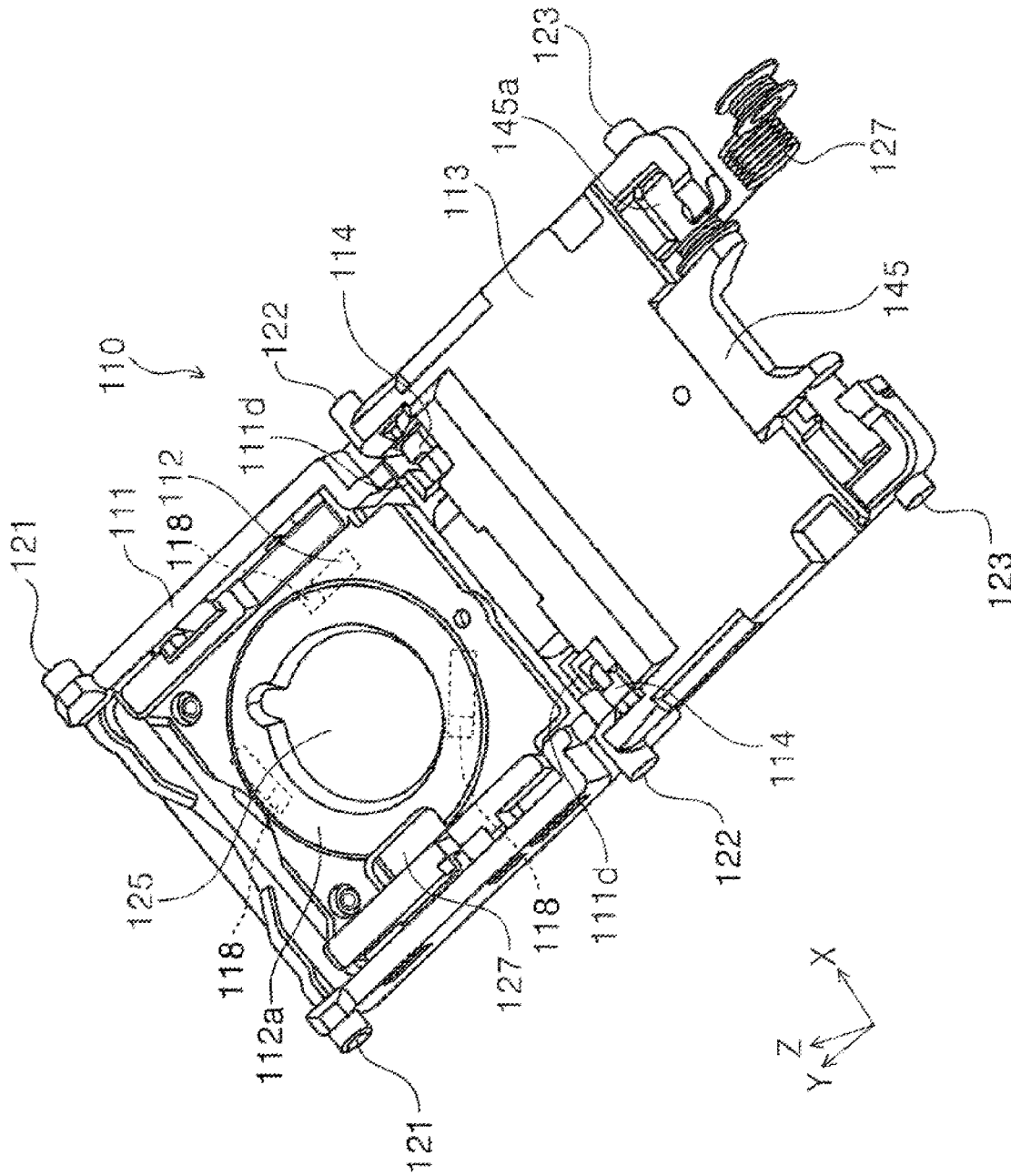
FIG. 10 is a perspective view of the shutter unit.

Next, the shutter unit 110 disposed in a bottom portion of the apparatus main body 50 will be described. As illustrated in FIG. 10, the shutter unit 110 is a unit body that is configured to include a shutter holding member 111, a shutter member 112, and a link member 113 which is one example of a sliding member. In the present embodiment, the shutter holding member 111, the shutter member 112, and the link member 113 are formed of a resin material.

The shutter holding member 111 and the link member 113 are coupled to be relatively rotatable through two coupling shafts 114. The two coupling shafts 114 are shafts that are integrated with the link member 113 using a resin material. The coupling shafts 114 are supported by shaft holding portions 111*d* formed in the shutter holding member 111.

A first guide shaft 121 is integrated with the shutter holding member 111 on a +X direction side surface and a −X direction side surface of the shutter holding member 111. In addition, a second guide shaft 122 and a third guide shaft 123 are integrated with the link member 113 on a +X direction side surface and a −X direction side surface of the link member 113.

Next, as illustrated in 15, a first lower guide portion 21c, a second lower guide portion 21d, and a third lower guide portion 21e are formed in the Y axis direction in a +X direction end portion and a −X direction end portion of the opening portion forming member 21. The first lower guide portion 21c and the second lower guide portion 21d have a shape in which a −Y direction end portion thereof is curved to the +Z direction in the −Y direction.

On a +X direction end portion and a −X direction end portion of the bottom first frame 53, a first upper guide portion 53c is formed with the first guide shaft 121 interposed between the first upper guide portion 53c and the first lower guide portion 21c. In addition, on a +X direction end portion and a −X direction end portion of the bottom second frame 49, an upper guide portion 49d is formed with the first guide shaft 121 interposed between the upper guide portion 49d and the first lower guide portion 21c.

Similarly, on the +X direction end portion and the −X direction end portion of the bottom first frame 53, a second upper guide portion 53d is formed with the second guide shaft 122 interposed between the second upper guide portion 53d and the second lower guide portion 21d.

In addition, similarly, on the +X direction end portion and the −X direction end portion of the bottom first frame 53, a third upper guide portion 53e is formed with the third guide shaft 123 interposed between the third upper guide portion 53e and the third lower guide portion 21e.

In such a manner, the first guide shaft 121, the second guide shaft 122, and the third guide shaft 123 are in a state of being interposed between the opening portion forming member 21, the bottom first frame 53, and the bottom second frame 49 in the Z axis direction, and are guided in the Y axis direction by the opening portion forming member 21, the bottom first frame 53, and the bottom second frame 49.

The first guide shaft 121 is disposed in the shutter holding member 111. Thus, a movement trajectory of the shutter holding member 111 is defined by the first lower guide portion 21c and the first upper guide portion 53c, the first lower guide portion 21c and the upper guide portion 49d, and the coupling shafts 114.

In addition, the second guide shaft 122 and the third guide shaft 123 are disposed in the link member 113. Thus, a movement trajectory of the link member 113 is defined by the second lower guide portion 21d and the second upper guide portion 53d, and the third lower guide portion 21e and the third upper guide portion 53e.

A +Y direction movement limit, that is, the closed state, of the shutter unit 110 is defined by causing the first guide shaft 121 to abut on a movement regulation portion 49b formed in the bottom second frame 49. In addition, a −Y direction movement limit, that is, the open state, of the shutter unit 110 is defined by causing the first guide shaft 121 to abut on a movement regulation portion 21f formed in the opening portion forming member 21. In the present embodiment, the second guide shaft 122 and the third guide shaft 123 do not define a Y direction movement limit of the shutter unit 110.

Figure 8:
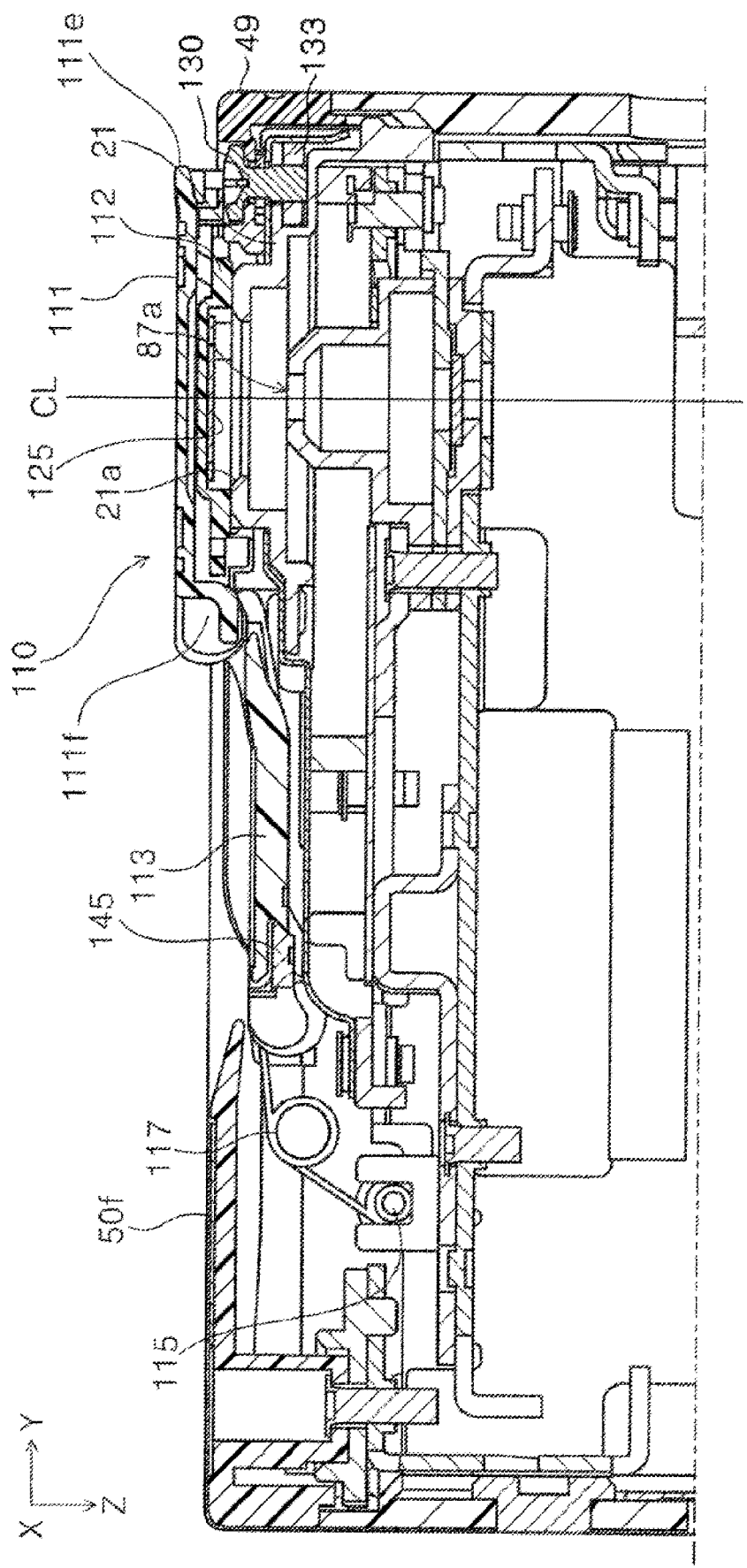
FIG. 8 is VIII-VIII cross-sectional view of FIG. 6.
Figure 9:
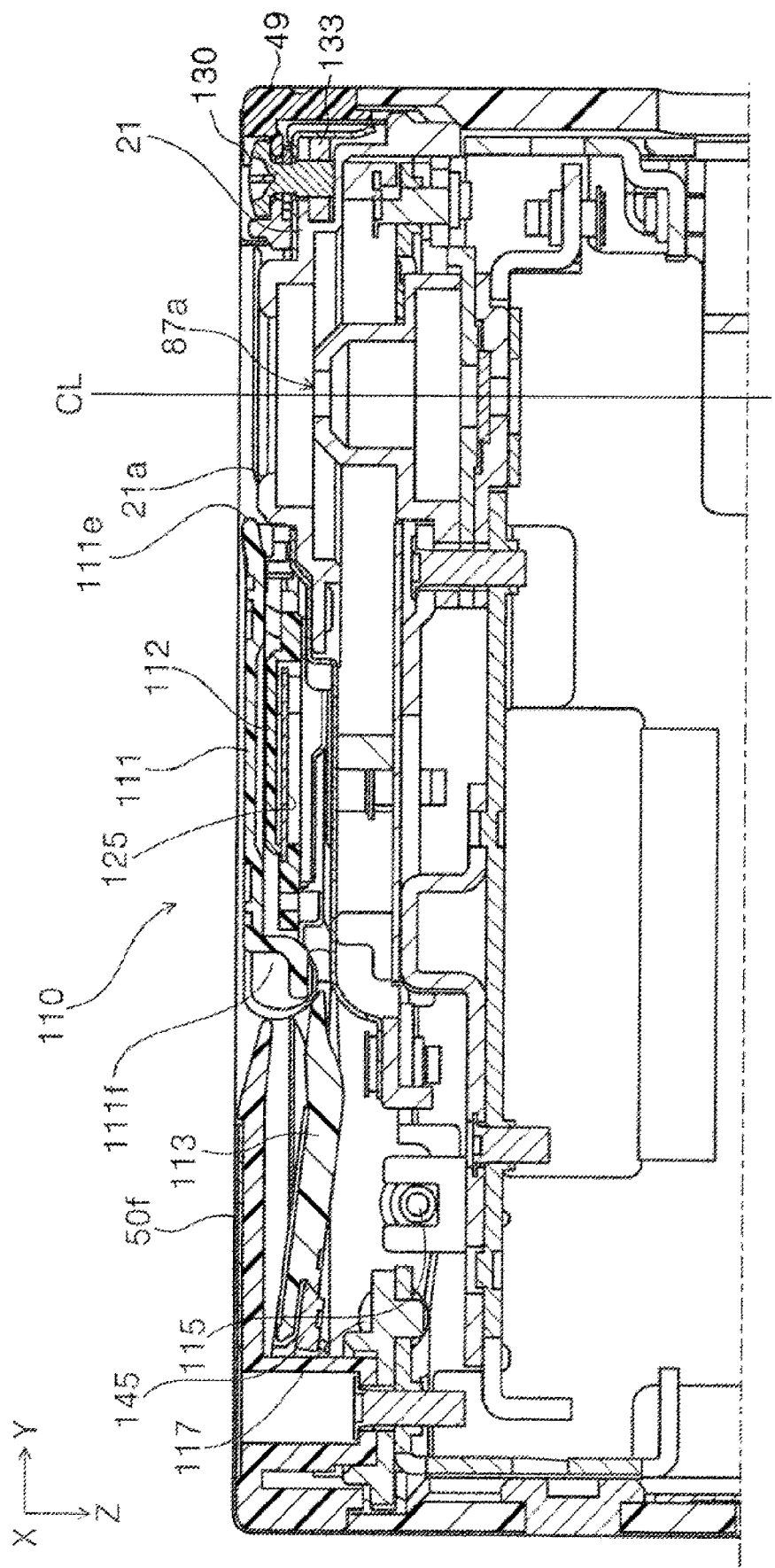
FIG. 9 is IX-IX cross-sectional view of FIG. 7.

Next, as illustrated in FIG. 8 and FIG. 9, a spring hook shaft 115 is disposed in the apparatus main body 50. One end of a torsion spring 117 that is one example of a spring member is rotatably fixed to the spring hook shaft 115. A tip end portion at one end of the torsion spring 117 is formed into a coil shape through which the spring hook shaft 115 can pass. The spring hook shaft 115 is integrated with the opening portion forming member 21 by a resin material.

The other end of the torsion spring 117 is hooked to a shaft portion 145a that is formed in a spring support member 145 constituting the shutter unit 110 as illustrated in FIG. 10. The spring support member 145 is a member mounted on the link member 113.

As described above, the torsion spring 117 can rotate in the Y-Z plane, in other words, can change a posture.

When the shutter unit 110 is in the closed state in FIG. 8, the torsion spring 117 applies a pressing force to the shutter unit 110 in the +Y direction. Accordingly, the shutter unit 110 is held in the closed state.

When the shutter unit 110 is displaced to the open state illustrated in FIG. 9 from this state, the posture of the torsion spring 117 changes, and this change in posture switches a direction of force exerted on the shutter unit 110 by the torsion spring 117 from the +Y direction to the −Y direction. Accordingly, the shutter unit 110 is held in the open state.

An open direction mark 111g and a closed direction mark 111h are disposed on an upper surface of the shutter holding member 111 as illustrated in FIG. 4. These marks present an operation direction of the shutter unit 110 to the user.

In addition, a finger hook edge portion 111e is formed in a +Y direction end portion of the upper surface of the shutter holding member 111. The finger hook edge portion 111e has a shape that protrudes further in the −Z direction than the bottom second frame 49 and is slightly inclined to the −Z direction in the +Y direction when the shutter unit 110 is in the closed state as illustrated in FIG. 8. Accordingly, when the user operates the shutter unit 110 from the closed state toward the open state, the user easily hooks a finger to the finger hook edge portion 111e, and operability is improved.

In addition, a finger hook recessed portion 111f is formed in a −Y direction end portion of the upper surface of the shutter holding member 111. Here, as illustrated in FIG. 9, when the shutter unit 110 is in the open state, the shutter holding member 111 does not protrude further in the −Z direction than the bottom surface 50f. However, by forming the finger hook recessed portion 111f in the shutter holding member 111, the user can hook a finger to the finger hook recessed portion 111f when the user operates the shutter unit 110 from the open state toward the closed state, and the operability is improved.

Next, the shutter member 112 is disposed on a +Z direction side of the shutter holding member 111 as illustrated in FIG. 10. A white plate 125 that is a reflection reference surface is disposed on a +Z direction side of the shutter member 112. In order to acquire the reflection reference value, the white plate 125 is white such that reflectance is close to 100%.

The white plate 125 is positioned in a center region of the shutter member 112 in a planar direction, that is, in the X-Y plane. Here, positioning the white plate 125 in the center region of the shutter member 112 in the planar direction means that a center position of the shutter member 112 in the planar direction is included within a range of the white plate 125. The center position of the shutter member 112 in the planar direction is a center position of the shutter member 112 in the Y axis direction and the X axis direction and, in the present embodiment, approximately coincides with the optical axis CL or is near at least the optical axis CL.

The shutter member 112 is disposed to be displaceable in the Z axis direction, that is, in a direction of approaching to and separating from the opening portion 21a, with respect to the shutter holding member 111. A plate spring 118 as a pressing member that presses the shutter member 112 in the +Z direction, that is, toward the opening portion 21*a*, is disposed between the shutter member 112 and the shutter holding member 111. In the present embodiment, the plate spring 118 is arranged at positions of approximately equal intervals around the white plate 125.

When the shutter unit 110 is in the closed state, a contact surface 112*a* of the shutter member 112 is in close contact with a shutter facing surface 21*g* (refer to FIG. 11) by a pressing force of the plate spring 118.

Here, the shutter facing surface 21*g* is a −Z direction surface of a part in which the opening portion 21*a* is formed in the opening portion forming member 21. The shutter facing surface 21*g* is a planar surface that has a ring shape in plan view.

In addition, the contact surface 112*a* is a surface that has a ring shape along the shutter facing surface 21*g*.

By pressing the shutter member 112 toward the opening portion 21*a*, the contact surface 112*a* is pressed against the shutter facing surface 21*g*. Accordingly, the opening portion 21*a* is closed, and this suppresses occurrence of a gap between the contact surface 112*a* and the shutter facing surface 21*g* and suppresses entrance of dust or the like inside the apparatus through the opening portion 21*a*.

In addition, since the shutter member 112 is pressed toward the opening portion 21*a* by the plate spring 118, a position or a direction of the white plate 125 is unlikely to vary, and an appropriate reference value can be obtained.

Figure 17A:
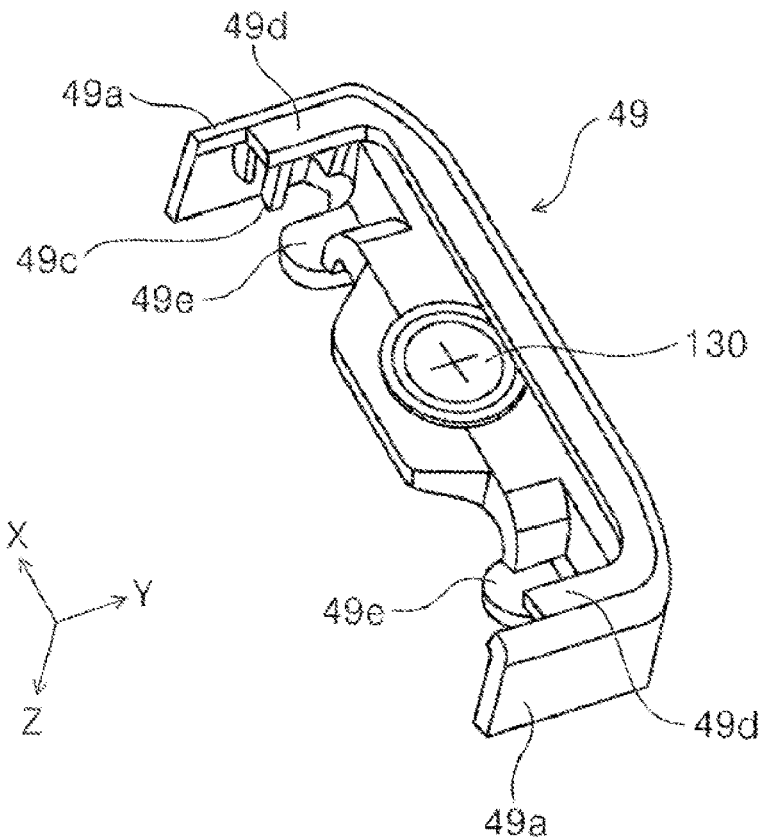
FIGS. 17A and 17B are perspective views of the bottom second frame.
Figure 17B:
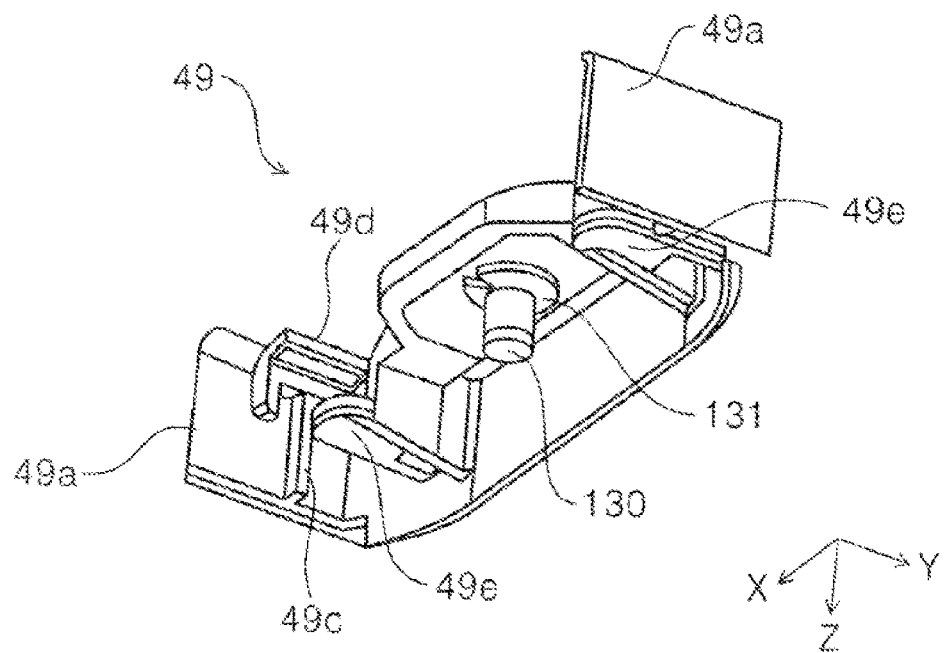

Next, the bottom second frame 49 is disposed to be attachable to and detachable from the apparatus main body 50. More specifically, the bottom second frame 49 includes a first screw 130 as illustrated in FIGS. 17A and 17B. As illustrated in FIG. 17B, the first screw 130 is held by a washer 131 in order not to be separated from the bottom second frame 49.

An overlapping portion 49*a* having a surface parallel to the Y-Z plane is formed in both end portions of the bottom second frame 49 in the X axis direction. A rib 49*c* that extends in the Z axis direction is formed on an inner side of the overlapping portion 49*a*.

Figure 12:
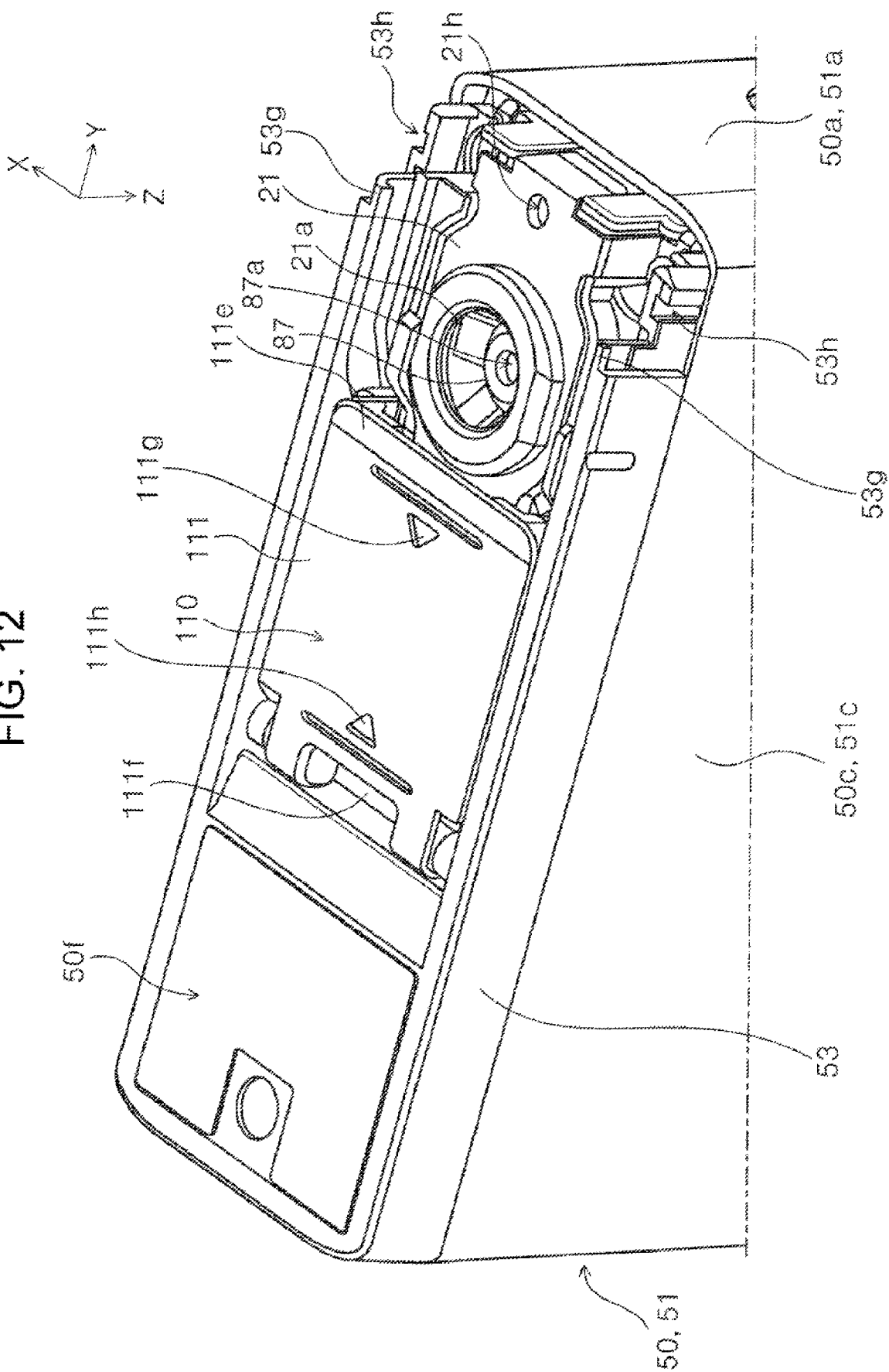
FIG. 12 is a diagram of a state where a bottom second frame is detached from the state in FIG. 11.

Meanwhile, as illustrated in FIG. 12, an overlapping portion 53*g* is formed in the bottom first frame 53. A guide groove 53*h* that extends in the Z axis direction is formed in the overlapping portion 53*g*. Accordingly, when the bottom second frame 49 is mounted, the rib 49*c* of the bottom second frame 49 fits in the guide groove 53*h* of the bottom first frame 53 and is guided in the Z axis direction. In a mounted state of the bottom second frame 49, fitting the rib 49*c* in the guide groove 53*h* maintains a relative position between the bottom first frame 53 and the bottom second frame 49 in the Y axis direction.

In the mounted state of the bottom second frame 49, the bottom first frame 53 and the bottom second frame 49 constitute a periphery of the bottom surface 50*f*. In the mounted state of the bottom second frame 49, the overlapping portion 49*a* of the bottom second frame 49 overlaps with the overlapping portion 53*g* of the bottom first frame 53 as illustrated in FIG. 11. That is, the bottom first frame 53 and the bottom second frame 49 alternately overlap with each other in coupled parts.

Such a configuration can suppress entrance of extraneous light through the coupled parts of the bottom first frame 53 and the bottom second frame 49 and can obtain an appropriate color measurement result.

Next, a screw hole 21*h* is formed in the opening portion forming member 21 as illustrated in FIG. 12. A nut 133 is disposed inside the screw hole 21*h* as illustrated in FIG. 8 and FIG. 9. Accordingly, the first screw 130 disposed in the bottom second frame 49 fits in the nut 133 through the screw hole 21*h*, and the bottom second frame 49 is fixed to the apparatus main body 50.

Next, in FIGS. 17A and 17B, the upper guide portion 49*d* is formed in both end portions of the bottom second frame 49 in the X axis direction. A screw cover portion 49*e* is formed on an inner side of the upper guide portion 49*d*. As illustrated in FIG. 7, the screw cover portion 49*e* covers second screws 132 that are positioned on both sides of the first screw 130 in the X axis direction. The second screws 132 are screws that fix the opening portion forming member 21 to the apparatus main body 50.

In such a manner, the second screws 132 are covered with the screw cover portion 49*e* in the mounted state of the bottom second frame 49 and are exposed by detaching the bottom second frame 49. Such a configuration can suppress accidental detachment of the second screws 132 when the bottom second frame 49 is detached.

Here, as illustrated in FIG. 4 and FIG. 6, in the closed state of the shutter unit 110, the first screw 130 is covered with the shutter unit 110. Since the first screw 130 is covered with the shutter unit 110 in the closed state of the shutter unit 110, esthetic appearance when the apparatus is not used can be maintained. When the first screw 130 is separated, the shutter unit 110 is set to the open state as illustrated in FIG. 7 and FIG. 11, and next, the first screw 130 is separated. Accordingly, the bottom second frame 49 can be detached as illustrated by a change from FIG. 11 to FIG. 12.

Figure 16:
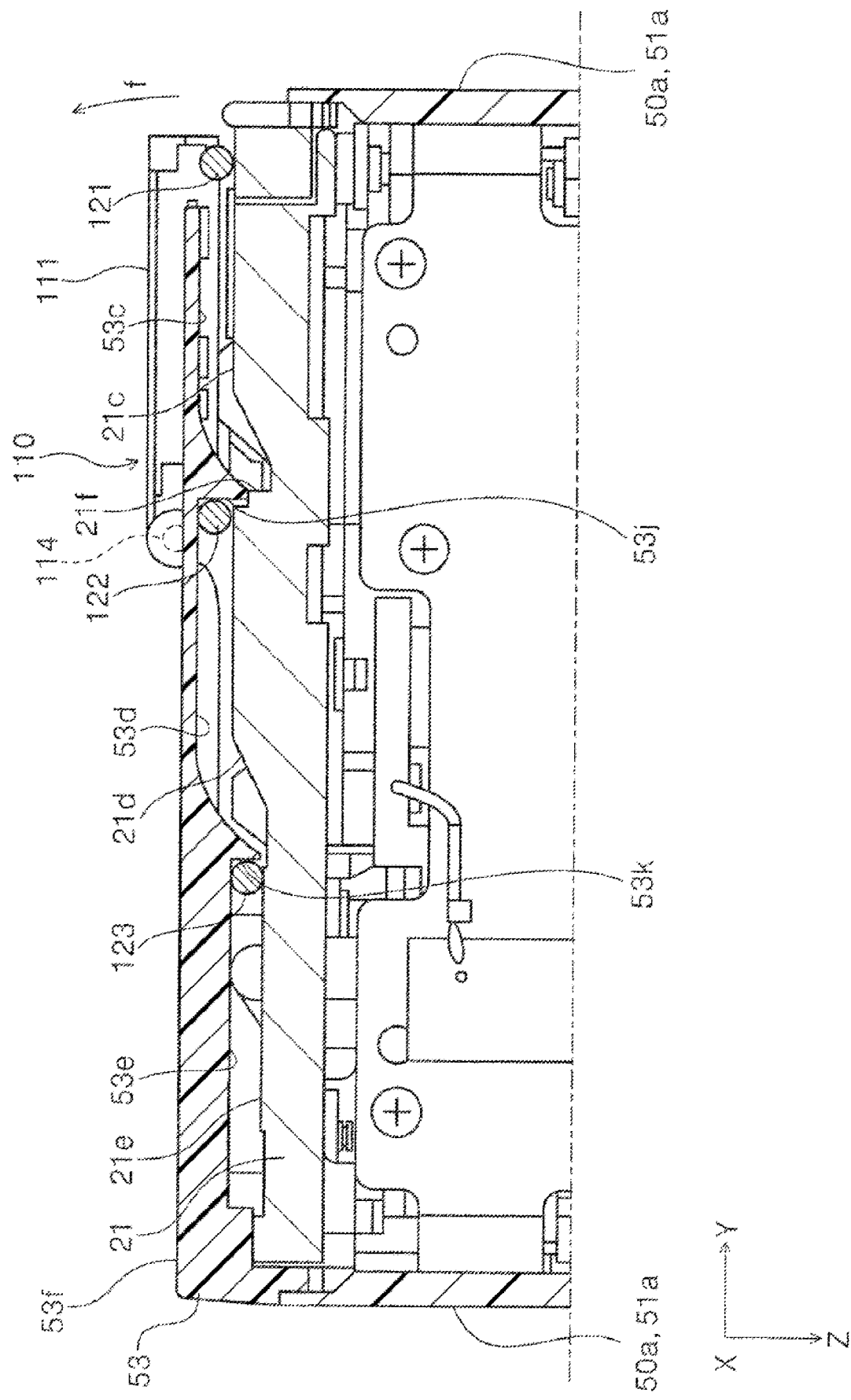
FIG. 16 is a diagram of a state where the bottom second frame is detached from the state in FIG. 15.

In a state where the bottom second frame 49 is detached, when the shutter unit 110 is caused to slide toward the closed state from the open state, the second guide shaft 122 abuts on a movement regulation portion 53*j* of the bottom first frame 53, and the third guide shaft 123 abuts on a movement regulation portion 53*k* of the bottom first frame 53 as illustrated in FIG. 16. Accordingly, movement in the +Y direction is regulated.

Figure 13:
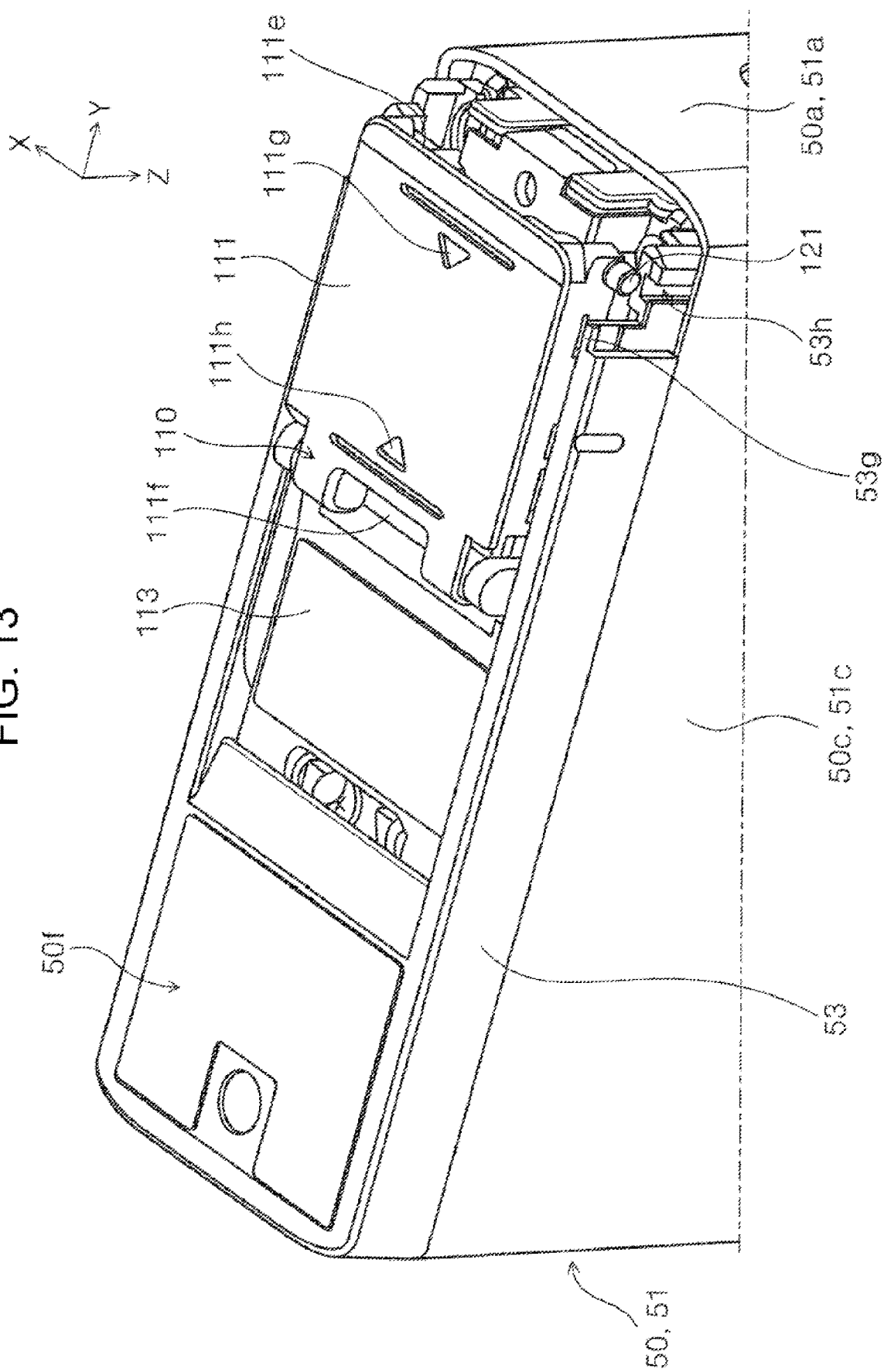
FIG. 13 is a diagram of a state where the shutter unit is caused to slide in a +Y direction from the state in FIG. 12.
Figure 14:
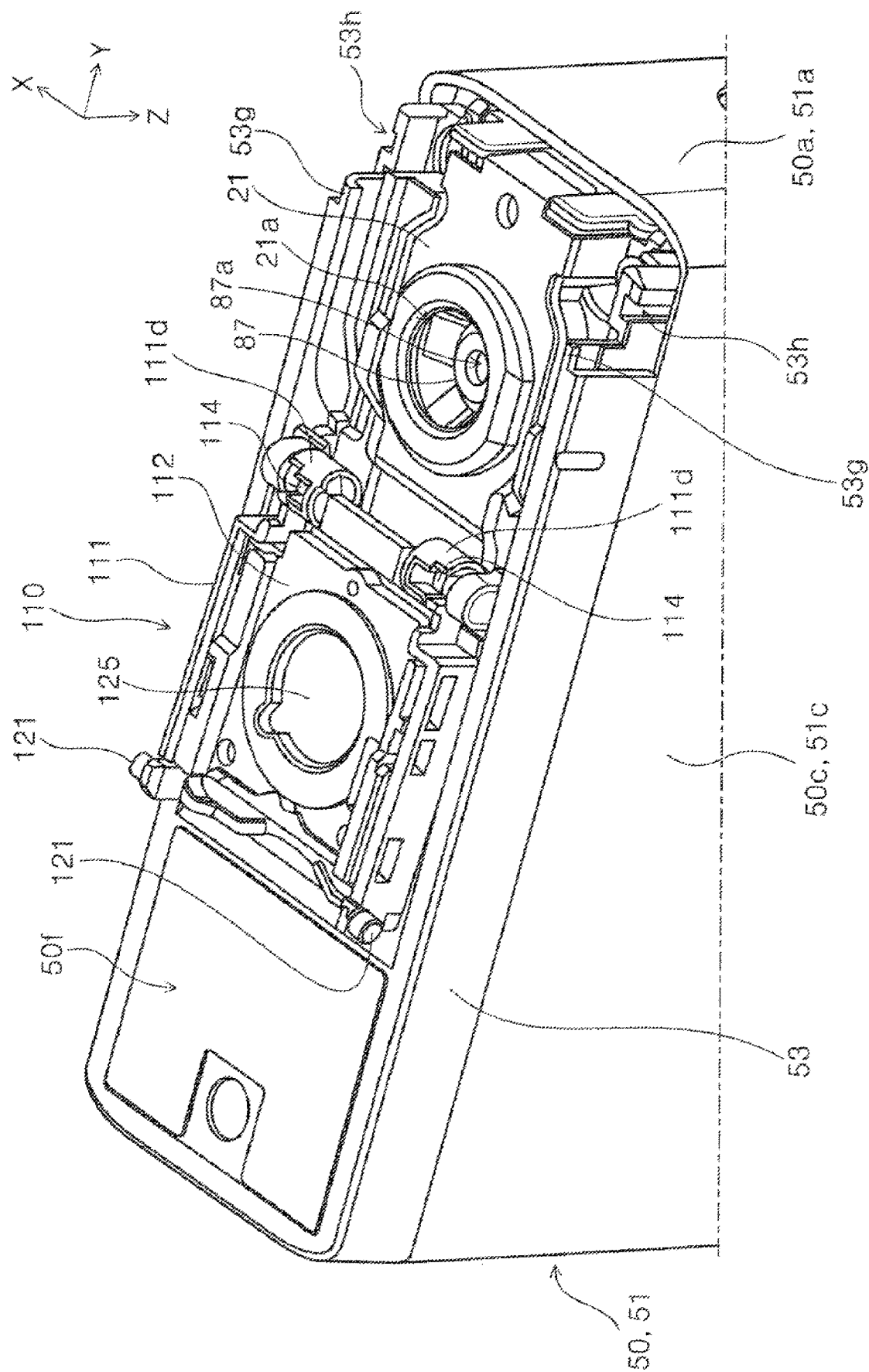
FIG. 14 is a diagram of a state where a shutter member is rotated from the state in FIG. 13.
Figure 15:
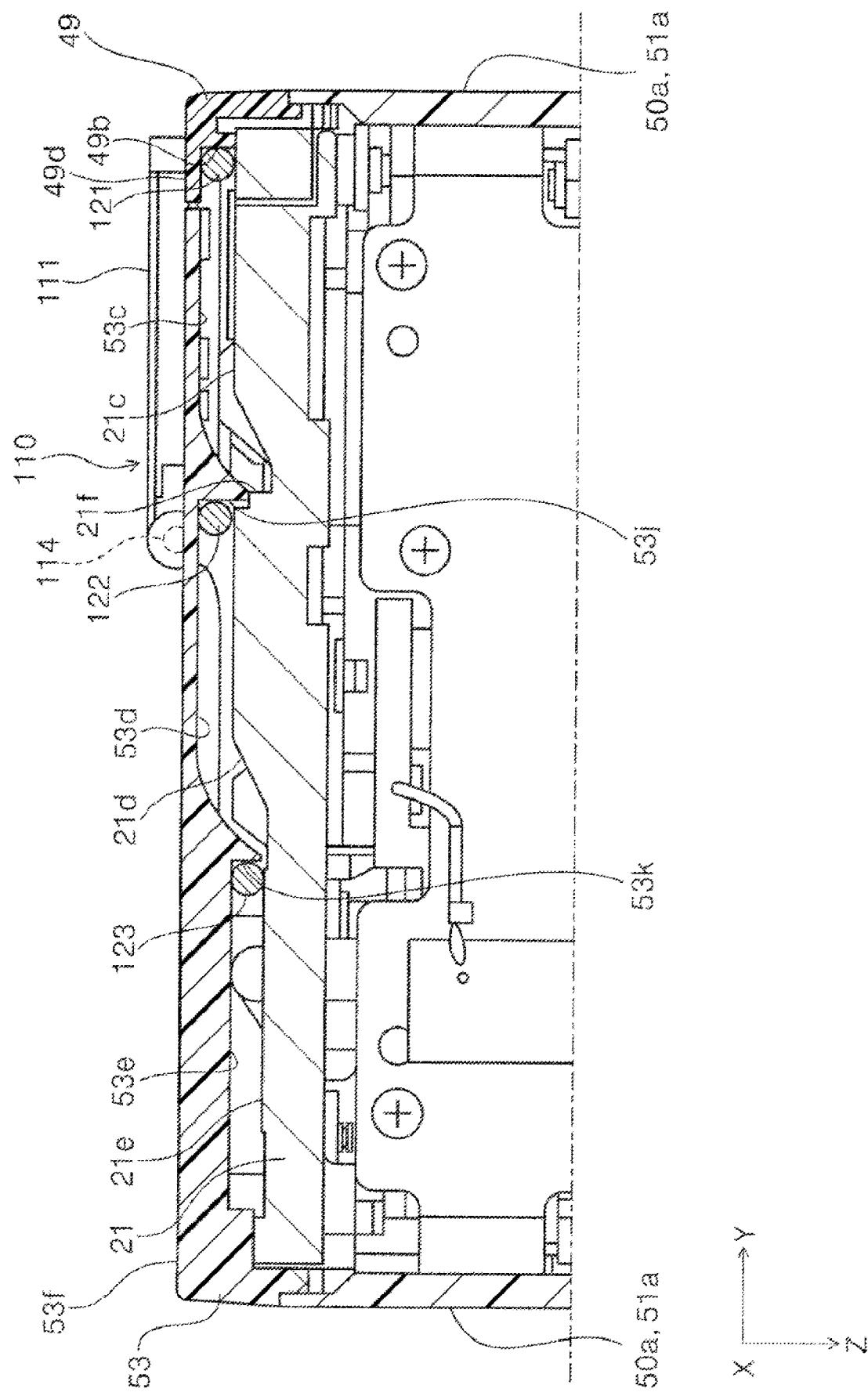
FIG. 15 is XV-XV cross-sectional view of FIG. 6.

In this state, the first guide shaft 121 is not regulated by the bottom second frame 49. Thus, as illustrated by arrow f in FIG. 16, the shutter holding member 111 and the shutter member 112 can be rotated about the coupling shafts 114. When the shutter holding member 111 and the shutter member 112 are rotated, the white plate 125 can be exposed outside the apparatus as illustrated by a change from FIG. 13 to FIG. 14. In this state, the shutter holding member 111 and the shutter member 112 are supported by abutting on the bottom surface 50*f* as illustrated in FIG. 14.

As described above, the shutter unit 110 that is a unit capable of switching between the closed state in which the opening portion 21*a* is covered, and the open state which is a state when color measurement is performed and in which the opening portion 21*a* is open, and that includes the white plate 125 at a position facing the opening portion 21*a* in the closed state as a reference of reflectance is disposed to be capable of switching to, in addition to the closed state and the open state, an exposed state (refer to FIG. 14) in which the white plate 125 is exposed outside the apparatus. Accordingly, maintenance of the white plate 125 can be easily performed, and an appropriate reflection reference value can also be acquired.

In addition, in the present embodiment, the shutter unit 110 includes the link member 113 that is a sliding member capable of sliding along the bottom surface 50*f*, and the shutter member 112 that is capable of sliding along the bottom surface 50*f* together with the link member 113, includes the white plate 125, and can rotate with respect to the link member 113. Switching to the exposed state is performed by rotating the shutter member 112 with respect to the link member 113. Such a configuration enables switching to the exposed state to be performed with a simple configuration.

In the present embodiment, the shutter member 112 is a member separated from the shutter holding member 111, and the shutter member 112 is configured to rotate with respect to the link member 113 through the shutter holding member 111. Alternatively, for example, the shutter holding member 111 and the shutter member 112 may be configured to be integrated.

In addition, in the present embodiment, the shutter member 112 abuts on the bottom surface 50f in the exposed state. Thus, when the white plate 125 is cleaned, the bottom surface 50f can support the shutter member 112, and damage to the shutter unit 110 due to application of strong force to the white plate 125 can be suppressed. Particularly, application of strong force to the coupling shafts 114 can be suppressed, and damage to the coupling shafts 114 can be suppressed.

In addition, in the present embodiment, the shutter unit 110 switches to the open state by sliding in the −Y direction (first direction) from the closed state and switches to the closed state by sliding in the +Y direction (second direction) from the open state. The shutter member 112 includes the first guide shaft 121 that is a boss protruding in the X axis direction, the bottom first frame 53 constituting the bottom surface 50f, and the bottom second frame 49 that is a member constituting the bottom surface 50f together with the bottom first frame 53 and is positioned in the +Y direction with respect to the bottom first frame 53. The bottom second frame 49 is attachable and detachable, regulates rotation of the first guide shaft 121 in the mounted state, and allows the rotation of the first guide shaft 121 by being detached.

In such a manner, the first guide shaft 121, that is, the shutter member 112, is configured to be rotatable by detaching the bottom second frame 49. In other words, in the mounted state of the bottom second frame 49, rotation of the shutter member 112 is regulated. That is, switching of the shutter unit 110 to the exposed state is regulated. Accordingly, unintended switching of the shutter unit 110 to the exposed state is suppressed, and clinging of dust or the like to the white plate 125 can be suppressed.

The present disclosure is not limited to each embodiment described above, and various modifications can be made within the scope of the disclosure disclosed in the claims. Such modifications also fall within the scope of the present disclosure.

For example, in the embodiment, the shutter unit 110 is configured such that the white plate 125 is exposed outside the apparatus by rotating the shutter member 112. Alternatively, like a shutter unit 110A illustrated in FIGS. 18A and 18B, the white plate 125 may be exposed outside the apparatus by performing a sliding operation of the shutter unit 110A. As illustrated by a change from FIG. 18A to FIG. 18B, detaching the bottom second frame 49 can cause the shutter unit 110A to protrude in the +Y direction, and the white plate 125 can be exposed outside the apparatus.

Alternatively, it may be configured that the white plate 125 is exposed outside the apparatus by causing the shutter unit 110 to slide in the X axis direction. Alternatively, it may be configured that the white plate 125 is exposed outside the apparatus by rotating the shutter unit 110 about a rotation shaft in the Z axis direction or a rotation shaft in the Y axis direction. In addition, in these cases, the open state of the shutter unit 110 and the exposed state in which the white plate 125 is exposed outside the apparatus may be the same state.

In addition, in the embodiment, while the bottom second frame 49 is configured to be fixed by the first screw 130, the present disclosure is not limited to the screw. A structure in which the bottom second frame 49 is fixed by a snap-fit structure may be available.

In addition, in the embodiment, while the first screw 130 is covered in the closed state of the shutter unit 110 and is exposed by switching the shutter unit 110 from the closed state to the open state, a structure in which the first screw 130 is exposed in the closed state of the shutter unit 110 may be available.

In addition, while the color measurement apparatus 1 incorporates the battery 17 in the embodiment, the battery 17 may be configured to be detachable. That is, the color measurement apparatus 1 may be configured to not incorporate the battery 17. In addition, in this case, the battery 17 may be a primary battery that is not repeatedly charged and discharged.

In addition, in the present embodiment, the incident light processing portion 2 is configured to include the optical filter device 3 and the light reception portion 4, and the optical filter device 3 is a variable wavelength Fabry-Perot etalon that transmits a predetermined wavelength component of the incident light. However, the present disclosure is not limited thereto. For example, a spectroscopic method that uses a diffraction lattice may be used as a spectroscopic method. In addition, an apparatus configuration that employs a stimulus value direct reading method of directly measuring three stimulus values of base colors as a color measurement principle may be available.

In addition, while the LED is used as the light emission element used in the light emission portion 9 in the present embodiment, the present disclosure is not limited thereto. For example, a xenon lamp may be used.

What is claimed is:

1. A color measurement apparatus comprising:
   an opening portion forming member that includes an opening, wherein
      the opening portion forming member is arranged in a bottom portion of the color measurement apparatus, and
      the opening is a region that causes light arriving from a measurement target to enter inside the color measurement apparatus;
   a light emitter configured to emit light for measurement toward the measurement target;
   an incident light processing portion that includes a photo diode, wherein the photo diode is configured to process light incident through the opening; and
   a shutter unit that is configured to switch between a closed state in which the opening is covered, and an open state which is a state when color measurement is performed and in which the opening is open, and that has a reflection reference surface at a position facing the opening in the closed state as a reference of reflectance, wherein
      the shutter unit is disposed such that the shutter unit is configured to switch to, in addition to the closed state and the open state by sliding, an exposed state by rotating in which the reflection reference surface is toward outside and is exposed outside the color measurement apparatus,
      the shutter unit switches to the open state by sliding in a first direction from the closed state and switches to the closed state by sliding in a second direction opposite to the first direction from the open state, the shutter unit includes:
- a sliding member configured to slide along a bottom surface of the color measurement apparatus, wherein the sliding member is a link that is coupled to the shutter unit,
- a shutter that is configured to slide along the bottom surface together with the sliding member, has the reflection reference surface, and is configured to rotate with respect to the sliding member,
- a boss that protrudes in a direction intersecting with the first direction and the second direction,
- a bottom first frame that constitutes the bottom surface, and
- a bottom second frame that is a member constituting the bottom surface together with the bottom first frame and is positioned in the second direction with respect to the bottom first frame, the bottom second frame is configured to be attached and detached, regulates rotation of the boss in a mounted state, and allows the rotation of the boss by being detached, and the shutter unit switches to the exposed state by rotation of the shutter with respect to the sliding member.

2. The color measurement apparatus according to claim 1, wherein the shutter abuts on the bottom surface in the exposed state.

3. The color measurement apparatus according to claim 1, further comprising:
- a first screw that fixes the bottom second frame; and
- a second screw that fixes the opening portion forming member, wherein the second screw is covered with the bottom second frame in the mounted state of the bottom second frame and is exposed by detaching the bottom second frame.

4. The color measurement apparatus according to claim 1, wherein
- in the mounted state of the bottom second frame, the bottom first frame and the bottom second frame constitute a periphery of the bottom surface, and
- the bottom first frame and the bottom second frame alternately overlap with each other in coupled parts.

5. The color measurement apparatus according to claim 1, wherein the shutter unit includes a shutter holding member that includes a first guide shaft, wherein the shutter holding member holds the shutter such that the shutter is configured to be displaced in a direction of approaching to and separating from the opening, and
    a spring that presses the shutter toward the opening.

6. The color measurement apparatus according to claim 1, wherein
- the incident light processing portion further includes a variable wavelength optical filter configured to transmit a predetermined wavelength component of incident light, and
- the photo diode is further configured to receive light transmitted through the variable wavelength optical filter.

7. The color measurement apparatus according to claim 6, wherein the variable wavelength optical filter is a Fabry-Perot etalon.

* * * * *